United States Patent
Vibhuti

(10) Patent No.: US 12,503,144 B2
(45) Date of Patent: Dec. 23, 2025

(54) HIGH THROUGHPUT TRANSPORTATION SYSTEM WITH SEAMLESS CARRIAGE SWITCHING BETWEEN TRACKS ALONG THE VERTICAL PLANE

(71) Applicant: Anupam Vibhuti, New Delhi (IN)

(72) Inventor: Anupam Vibhuti, New Delhi (IN)

( * ) Notice: Subject to any disclaimer, the term of this patent is extended or adjusted under 35 U.S.C. 154(b) by 651 days.

(21) Appl. No.: 17/999,156

(22) PCT Filed: May 24, 2021

(86) PCT No.: PCT/IN2021/050503
§ 371 (c)(1),
(2) Date: Nov. 17, 2022

(87) PCT Pub. No.: WO2021/240541
PCT Pub. Date: Dec. 2, 2021

(65) Prior Publication Data
US 2023/0192153 A1 Jun. 22, 2023

(30) Foreign Application Priority Data
May 23, 2020 (IN) .............................. 202011021745

(51) Int. Cl.
*B61F 7/00* (2006.01)
*B61B 5/02* (2006.01)
(Continued)

(52) U.S. Cl.
CPC ................. *B61F 7/00* (2013.01); *B61B 5/02* (2013.01); *B61B 13/00* (2013.01); *B61C 3/00* (2013.01);
(Continued)

(58) Field of Classification Search
CPC ... B61F 7/00; B61F 5/02; B61C 13/00; B61C 3/00; B61B 5/02; B61B 13/00;
(Continued)

(56) References Cited

U.S. PATENT DOCUMENTS

| | | | |
|---|---|---|---|
| 105,984 A * | 8/1870 | Sanford | B61F 7/00 104/33 |
| 1,563,530 A * | 12/1925 | Saunders | B61F 7/00 104/33 |

(Continued)

FOREIGN PATENT DOCUMENTS

| | | | | |
|---|---|---|---|---|
| CN | 104787056 A | * | 7/2015 | E01B 25/28 |
| CN | 113120019 A | * | 7/2021 | B61F 7/00 |
| IN | 201811014107 A | | 10/2019 | |

OTHER PUBLICATIONS

International Search Report & Written Opinion dated Sep. 3, 2021 from PCT Application No. PCT/IN2021/050503.

*Primary Examiner* — Zachary L Kuhfuss
(74) *Attorney, Agent, or Firm* — INNOVATION CAPITAL LAW GROUP, LLP; Vic Lin

(57) ABSTRACT

The present invention relates to the field of automated transportation systems. Particularly, it relates to a transportation system comprising guide-ways or tracks, vehicle units [100, 100a] with wheel-axle assembly for switching of vehicles from primary [20] to secondary track [22] on changing trajectory to maintain same vertical plane and the method. It comprises of central controller [101], vehicle chassis with main wheels [2W], guide wheels [4iw, 4ow], guide blocks [05, 06], actuator [09]. The chassis [30] has set of contractible axles fixed to wheels [2W] to enables movement from primary [20] to secondary track [22] by withdrawing the wheels [2W] from expanded position [C] to contracted position [C] or vice-versa. The forces required to compress the spring loaded axle axis is derived from inner guide wheels rolling over the edge flange [26] when swung using single linear motor actuator [09] and related electronic controls.

21 Claims, 24 Drawing Sheets

(51) Int. Cl.
*B61B 13/00* (2006.01)
*B61C 3/00* (2006.01)
*B61C 13/00* (2006.01)
*B61F 5/02* (2006.01)
*B61L 3/10* (2006.01)
*B61L 25/02* (2006.01)
*B61L 27/70* (2022.01)
*E01B 7/00* (2006.01)
*E01B 25/28* (2006.01)
*B60B 35/10* (2006.01)
*B61C 9/46* (2006.01)
*B61L 11/00* (2006.01)

(52) U.S. Cl.
CPC .............. *B61C 13/00* (2013.01); *B61F 5/02* (2013.01); *B61L 3/10* (2013.01); *B61L 25/021* (2013.01); *B61L 25/025* (2013.01); *B61L 27/70* (2022.01); *E01B 7/00* (2013.01); *E01B 25/28* (2013.01); *B60B 35/10* (2013.01); *B61C 9/46* (2013.01); *B61L 11/00* (2013.01)

(58) Field of Classification Search
CPC ........ B61L 3/10; B61L 25/021; B61L 25/025; B61L 27/70; B61L 11/00; E01B 25/28; B60B 35/10
USPC .......................... 104/33, 243; 105/178, 215.1
See application file for complete search history.

(56) References Cited

U.S. PATENT DOCUMENTS

| | | | | |
|---|---|---|---|---|
| 3,590,743 | A * | 7/1971 | Larson | B61B 3/02 104/80 |
| 3,732,828 | A * | 5/1973 | Wanner | B61F 7/00 104/243 |
| 3,831,527 | A * | 8/1974 | Peterson | B61L 11/02 105/215.1 |
| 3,977,487 | A * | 8/1976 | Katayose | B62D 1/265 180/401 |
| 4,183,304 | A * | 1/1980 | Forster | B62D 1/265 104/247 |
| 4,267,779 | A * | 5/1981 | Binder | B62D 1/265 180/401 |
| 4,436,170 | A * | 3/1984 | Mehren | B62D 1/265 180/401 |
| 5,421,265 | A * | 6/1995 | Sugimoto | B61H 9/00 105/178 |
| 5,471,933 | A * | 12/1995 | Yoshino | B61H 9/00 105/178 |
| 5,546,868 | A * | 8/1996 | Sugimoto | B61F 7/00 105/178 |
| 5,655,456 | A * | 8/1997 | Sugimoto | B61F 7/00 104/33 |
| 7,624,685 | B2 * | 12/2009 | Andreasson | E01B 25/00 104/130.07 |
| 8,561,547 | B2 * | 10/2013 | Shiroyama | B62D 1/265 104/246 |
| 8,950,337 | B1 * | 2/2015 | Davis | E01B 25/00 104/130.07 |
| 9,636,949 | B2 | 5/2017 | Jong | |
| 10,487,457 | B2 | 11/2019 | Wamble, III et al. | |
| 2007/0107621 | A1 | 5/2007 | Zou | |
| 2007/0113754 | A1 | 5/2007 | Andreasson et al. | |
| 2010/0043665 | A1 | 2/2010 | Brigham | |
| 2010/0211238 | A1 * | 8/2010 | David, Jr. | B61B 15/00 701/19 |
| 2012/0103227 | A1 * | 5/2012 | Maeyama | B61F 9/00 104/245 |
| 2012/0168525 | A1 * | 7/2012 | Kono | B61B 10/001 238/17 |
| 2013/0193277 | A1 * | 8/2013 | Kawauchi | E01B 7/00 246/415 R |
| 2013/0193278 | A1 * | 8/2013 | Yanobu | E01B 7/00 246/415 R |
| 2014/0190366 | A1 * | 7/2014 | Mukai | B62D 1/26 104/130.01 |
| 2015/0353106 | A1 * | 12/2015 | Maeyama | B62D 1/265 74/89.14 |
| 2016/0207548 | A1 * | 7/2016 | Katahira | B61B 13/00 |
| 2016/0272222 | A1 * | 9/2016 | Katahira | B61F 5/38 |
| 2016/0355059 | A1 * | 12/2016 | Katahira | B60C 11/24 |
| 2021/0339633 | A1 * | 11/2021 | Fujitani | B60L 3/106 |

* cited by examiner

VIEW FROM ABOVE

VIEW FROM ABOVE

VIEW FROM ABOVE

VIEW FROM BELOW

VIEW FROM ABOVE

VIEW FROM BELOW

VIEW FROM ABOVE

HIGH THROUGHPUT TRANSPORTATION SYSTEM WITH SEAMLESS CARRIAGE SWITCHING BETWEEN TRACKS ALONG THE VERTICAL PLANE

FIELD OF THE INVENTION

The present invention relates to the field of automated transportation systems. More particularly, it relates to a transportation system comprising guide-ways or tracks, vehicle units with wheel-axle assembly for switching of vehicles in a vertical plane. Advantageously, the present invention enables a vehicle to move along the primary track and maintain the same vertical plane as the movement of the vehicle, even after changing its trajectory into a secondary track. Advantageously, it provides for reduced number of mechanical parts, better integration of components exploiting multiple functional characteristics of the same components to achieve multiple objectives.

BACKGROUND OF THE INVENTION

Transport systems and in particular Personal Rapid Transit is a family of advanced alternative systems of transportation to carry people from one point to another. The journey in the Personal Transit System is enabled by automated driverless robotic vehicles which are available on-demand at boarding stations and once instructed about the destination, electro-mechanically move non-stop to the destination without stopping or waiting at intermediate stations. The robotic vehicles move along horizontal primary tracks along with many such similar automated vehicles in a controlled and choreographed manner serving many similar on-demand journeys. When these robotic vehicles reach their destination stations, they diverge from the primary track to move into the secondary track in order to stop at the platform. Similarly, when these vehicles leave their origin stations, they merge into the primary track in order to proceed for the journey.

The Personal Rapid Transit systems require such merges and diverge to happen all over the network also, wherever scheduled merges and diverges is planned for normal direction change requirements. Conventionally most Personal Rapid transportation have such merges and diverges happening on a horizontal plane after which the vehicle getting out of the main pair of rails or tracks moves in a horizontal plane. Unlike direction change only points, where the vehicle after switching, moves in only one direction, at all stop points, the vehicle has to diverge from the main track and quickly align itself parallel to the main track to reach the boarding alighting platform along and parallel to the same alignment throwing a double passenger discomfort challenge to be addressed. Therefore, this diverging and merging method is crucial at all stopping points from the passenger's inertial comfort point of view when the vehicle needs to stop for boarding and alighting purposes at stations.

Some Personal Rapid Transit systems switch along a vertical plane to reach the level of the secondary track or the station platform which is usually at a lower or higher level than the main pair of rails or tracks or to reach the level of the main pair of rails or tracks given that these are configured at a lower or higher level.

The point where the vehicle diverges or merges from and to the primary track is defined as the switching point and the specific configuration of the track, to enable the change in trajectory is defined as the 'switch'.

Tractive wheels of a vehicle can run on a flat surface or they can run along a pair of parallel rails [over ribs] or a pair of parallel tracks [within grooves] to reach a specific destination. When the vehicle has to move on a flat surface, the horizontal trajectory has to be controlled by using the steering wheel manually or by any other vehicle based mechanical process. However, when the vehicle moves along parallel rails or tracks, the change in the trajectory is achieved by the layout of the rail or track to follow a defined geometry usually in a predefined curve so that the wheels of the vehicle can follow the curved track or rail without derailing. The change in trajectory can also be achieved by making the vehicle diverge from a pair of rails or tracks to another pair of rails or tracks or merge into a pair of rails or tracks from another pair of rails or tracks.

It is also important to understand that whenever one vehicle amongst of a series of vehicles running on a pair of rails or tracks one behind the other needs to stop at any point of the pair of rails or tracks, say at a boarding alighting point, without forcing the vehicles behind it to stop as a result of its stopping, the only way it could do so is to diverge from the pair of rails or tracks on to another pair of rails or tracks so that the vehicle following the vehicle does not need to stop, but continue running without losing individual speed and/or collective throughput along the line. Similarly when one vehicle needs to join a series of vehicles running on a pair of rails or tracks one behind the other without making the vehicles behind the vehicle after which the vehicle needs to position itself, the only way it could do so is to merge from a pair of rails or tracks to the main pair of rails or tracks where the series of vehicles is running.

This horizontal switching of vehicle trajectory consumes 3D space on the horizontal plane. In some conceptions of the Personal Rapid Transportation system, the switching of vehicle trajectory may not be possible because of restricted availability of 3D space on the horizontal plane. Hence there is a need to switch the vehicle trajectory in a vertical plane to enable the vehicle reach the level of the station platform above or below. The limitation for such a switching is the track itself as the second track simply cannot diverge from the main pair of rails or tracks or merge into the main pair of rails or tracks while both pairs have the same separation distance between them. In a way, the vehicle wheels [conventionally with a fixed track width] simply cannot get onto the second pair of rails or tracks without physically being obstructed by the second pair of rails or tracks.

A study of prior art tells us that several track and wheel configurations have been differently designed to enable such horizontal or vertical changes in trajectory for transportation vehicles. These track and wheel configurations conventionally support both continuous as well as interrupted movement for vehicles while they change the trajectory. Some switches work around moving the secondary track configuration with fixed wheel chassis configuration. Others work around fixed track configurations with moving guide wheels in a fixed tractive wheels chassis configuration.

Several switching configurations are well-known to work around fixed track configurations with moving guide wheels and fixed track width tractive wheels within the vehicle chassis configuration. In most such switching configurations, the switching occurs in the horizontal plane of movement of vehicles while a few do disclose switching in the same vertical plane. Some prior art disclosing vertical plane switching mentions the need for switching vertically to reduce the effective switching ground footprint area and the need to economize on the same.

However no prior art refers to the potential high level of discomfort that will be experienced by a passenger in both cases of horizontal or vertical switching of trajectories especially at the high speeds required for a personal transit system to work with optimal throughput capacity at the switching location. The change of trajectory at high speeds for a horizontally switching system introduces an awkward sideward jerk experienced by a passenger in one direction followed by another jerk on the opposite direction to become parallel to the original trajectory especially at a station location. This sideways jerk is completely avoided when the vehicle switches trajectory in the vertical plane with only a minimal tickle in the abdomen, if at all. Such ticklish feeling is generally associated with sudden vertical drop descent like when an aircraft loses sudden height passing through turbulence. Under a graded descent this discomfort can be considered negligible for most people.

Other prior art discloses very complicated configurations of track guides and wheel combinations that introduce definite breaks in the transition surfaces between the merging or diverging tracks. At higher speeds such break in track surfaces is going to introduce uncomfortable noises and jerks for each traversing vehicle much like rhythmic clickety-clackety noise heard inside all railway carriages when moving over fish plates between rail joints. In a Personal Rapid Transit system with a high number and frequency of transiting vehicles, the noise and jerks produced may become unwarranted.

U.S. Pat. No. 8,950,337 disclose and claim a method of switching the trajectory of the moving vehicle in the same vertical plane as the movement trajectory. Let us consider 'switching the trajectory of the moving vehicle in the same vertical plane as the movement trajectory' as the primary objective of this invention. It discloses 3 essential components in the context of getting 'off' the main line into a station and getting 'on' the main line from a station of an elevated personal transportation system to achieve the aforesaid objective.
1. A track configuration
   a. with '3 sets of variable gauge rail tracks' as identified components—narrow gauge main rail, intermediate gauge switch rail and wide gauge cog rail
   b. where the switching rails used for removing the vehicle from the primary track are 'wider' in gauge than the primary rail.
   c. vehicle moves 'upwards' of the given trajectory while being removed and 'downwards' while joining the primary rail
2. A vehicle configuration
   a. with '2 sets of variable gauge wheels' for both front and rear side of the vehicle as identified components.—primary main [extending] wheel and a secondary extending [cog] wheel.
3. A method comprising vehicle components interacting with the track components during the trajectory change process.

It does not disclose the expansion and contraction mechanism used by the wheels used for switching.

It does refer a prior patent issued to the same patentee vide U.S. Pat. No. 7,788,000 on Aug. 21, 2010 [col 5 line 15] which refers to a similar context and discloses a separate set of wheels for traction in the form of standard wheels.

The present invention is novel over U.S. Pat. No. 8,950, 337 in light of the fact
1. that the objective is achieved using the 'same' single set of wheels [in contrast with 2 sets of variable gauge wheels] used for traction or propulsion purposes for change of track width to enable switching of the trajectory along a track with only '2' sets of tracks.
2. the track as per the present invention—which is a simple 'contiguous' flat surface in comparison to set of '3' conventional I shaped rails in U.S. Pat. No. 8,950, 337 as a contrastingly different form factor.

The engagement of these I shaped rails [ribs] with 2 sets of wheels in U.S. Pat. No. 8,950,337 signifies breaks in smooth rolling experience inside the vehicle—very similar to the rhythmic clickety-clackety noise heard inside all railway carriages when moving over fish plates between rail joints when the rail coach changes track length or switches tracks. It is practically impossible to have a 'seamless' or 'jerk free' experience while traversing the transitions.

In contrast a flat contiguous surface in the present invention with a rubber wheel rolling on it throughout the process of switching ensures there are no surface breaks and jerks as otherwise experienced when wheels as described in U.S. Pat. No. 8,950,337 'engages' or 'catches' the required rail for each step of the trajectory change process.

U.S. Pat. No. 9,636,949 discloses and claims a method of 'expanding or contracting the track width of a moving vehicle on the road surface for the objective of occupying lesser footprint on the road surface for the primary objective of more efficient use of the road space or for enhanced stability'.

It discloses one method or mechanism for enabling the two wheels of each axle to contract and expand along the axle axis using a combination of worm gear motor to drive an axle shaft with opposite direction threads on either side of the gear to move clockwise or anti clockwise. A right hand or left hand screw nut on one side of the axle screw mounted on the right hand or left hand wheel block enables the simultaneous inward and outward movement wheel blocks with the clockwise or anticlockwise movement of the axle.

It does not disclose anything related to the following that are specific to present invention.
1. Switching of vehicle trajectory from one path to another.
2. Use of fixed tracks as physical external surface guides and guide wheels to contract and expand the wheel block track widths to achieve the above objective.

The present invention does require the expansion and contraction of the track width [distance between wheel blocks] but is novel over U.S. Pat. No. 9,636,949 by way of adopting an entirely different method or mechanism to enable this wheel block expansion and contraction along the axle axis.

Moreover the mechanism as disclosed in U.S. Pat. No. 9,636,949 is completely redundant in of the present invention in a particular configuration addresses this issue, where the contraction and the required expansion/contraction is derived from the dynamic forces being applied along the axle axis on the wheel blocks by the rolling guide wheels along a converging/diverging pair of horizontally graded vertical edge surface available along the track.

The present invention is therefore has only limited or notional similarity to U.S. Pat. No. 9,636,949 as a relevant prior art.

US20100043665 discloses and claims a method of 'controlling or managing horizontal trajectory of a moving vehicle inside a track'.

It discloses that pairs of outer wheel guides running horizontally along the vertical edge surface of the track to maintain trajectory in normal conditions.

It also discloses that the trajectory can be changed in the horizontal plane by using 2 sets of inner guide wheels that selectively engage with the outer or inner side of the inner track edge flange to change trajectory in the required left or right direction using the directional force vector applied when the wheels roll along the flanges.

It does not disclose anything related to the switching of vehicle trajectory from one path to another in the same 'vertical' plane.

Present invention is different than US20100043665 in the following aspects:
1. The track guide mechanism allows the vehicle to change trajectory in the vertical plane compared to US20100043665 where the trajectory remains in the horizontal plane.
2. The track change wheel guides mechanism consists of only 1 pair of track guide wheels [compared to 2 pairs in US20100043665] that are actuated into position during the trajectory change process making it mechanically simpler.

The present invention is similar to US20100043665 as a relevant prior art by way of the outer track guide wheel. Besides this similarity, there is no learning that is being derived for the present invention.

U.S. Ser. No. 10/487,457B2 discloses a vertical switching in a magnetic levitation guideway transportation system comprising an upper branch segment of track, a lower branch segment of track, and a divergent zone.

The divergent zone has coextensive spaced rails extending from the trunk segment and splitting into upper rails extending to the upper branch segment, and lower rails extending to the lower branch segment, so that a vehicle engaging the rails and entering the switch at the trunk segment is guided and magnetically levitated to a selected one of either the upper branch segment or the lower branch segment.

Present invention is different than U.S. Ser. No. 10/487,457B2 in the following aspects:
1. In this invention primary and secondary track have different separation distance compared to U.S. Ser. No. 10/487,457B2 which discloses the same separation spacing.
2. In this invention mechanical forces generated from mechanical interaction between vehicle and guideway are utilized for change of trajectory and rubber wheels for traction compared to U.S. Ser. No. 10/487,457B2 which discloses electro-magnetic forces used for change of trajectory with contactless traction largely at higher speeds with free rolling wheel only at lower speeds, thereby not only interrupting seamless motion of the vehicle between high and low speeds but also being aided electrically in the process.
3. In the present invention traction is generated by interaction of rubber on steel surfaces compared to U.S. Ser. No. 10/487,457B2 which discloses traction generated by eddy forces in a special device, the nature of which is not disclosed.

The present invention is similar to U.S. Ser. No. 10/487,457B2 only with respect to the aspect of vertical change of trajectory. Besides this similarity, there is no learning that is being derived for the present invention that is based on pure mechanical means, using mechanical forces, but providing seamless uninterrupted surface interaction for traction and change of trajectory.

US20070107621A1 provides methods of guideway construction and vehicle operation for a three-dimensional transportation system, in which a vehicle changes lane or direction by widening or narrowing the width between its left wheels and its corresponding right wheels. In such a transportation system, vehicles diverge from a source lane and merge into a target lane aerially either above or below the tracks, through the empty space between the left guideway and the right guideway.

A transportation system is proposed in which traffic lanes could be stacked vertically one above another, and additional lanes could be added later without additional land usage. In such a transportation system, a vehicle could raise or lower its center of gravity in the vertical direction to offer the advantages of safe operation and easy loading or unloading. A transportation system is proposed that can accommodate dual-mode vehicles [vehicles capable of running on ground as well as moving on to the rails] suitable for automatically moving people and goods.

Present invention is different than US20070107621A1 in the following aspects:
1. In this invention mechanical forces generated from mechanical interaction between vehicle and guideway are utilized for change of trajectory and rubber wheels for traction compared to US20070107621A1 which does not disclose anything about the mechanism or the source of forces utilized for the track width expansion and contraction.
2. In this invention the wheels and the axle remain fixed and not allowed to turn as compared to US20070107621A1 which discloses change in the wheel motion or turning the wheel inward or outwards to expand and contract axially or to traverse horizontal curves.

The present invention is similar to U.S. Ser. No. 10/487,457B2 that it also discloses vertical change of trajectory using tracks having different separation distance and some mechanism to contract and expand the track width. Besides this conceptual similarity, there is no learning that is being derived for the present invention regarding the mechanism itself.

The present invention discloses a completely different method of achieving the change of track and trajectory, avoiding an otherwise undisclosed complex mechanism to enable the turning of both the wheels and the axle with respect to the vehicle trajectory.

Accordingly, there exists a need for a transport system with uniquely designed track and a simplified wheel-axle assemblage with least number of components enabling seamless switching of vehicles from the primary track to the secondary track in vertical plane of travel, without any mechanical shocks and or jerks to the switching vehicle thereby providing maximum passenger travel comfort. With high speed switching of tracks, enabled by a simplified track and wheel axle interaction, such a configuration would be able to preserve high throughput on the primary track while occupying the least footprint.

OBJECT OF THE INVENTION

It is a primary object of the present invention to provide a high throughput transportation system with seamless carriage switching between tracks along the vertical plane.

It is another object of the present invention to provide a transportation system particularly a rapid transport system comprising of one or more tracks, one or more vehicle units, a central controller and ingress egress locations.

It is the primary object of the invention to provide a track system and vehicle wheel configuration to enable a vehicle moving along the primary track, change its trajectory and move along a secondary rail track in the same vertical plane as the movement of the vehicle with enhanced passenger comfort.

It is another object of the invention to provide an integrated electro-mechanical mechanism simplified over any available prior art to achieve the primary object while keeping the vehicle aligned centrally between the track pairs at all times.

It is further object of the invention to completely avoid sideways to and fro jerk at the switching point experienced by a passenger inside the vehicle traversing the switch at higher throughput speeds (without slowing down at the switching point).

It is further object of the invention to enhance passenger ride comfort through the switching process by eliminating completely all breaks in the surface used for traction thereby enabling the change in trajectory to occur in smooth and continuous movement without slowing down the moving vehicle.

SUMMARY OF THE INVENTION

One or more of the problems of the conventional prior art may be overcome by various embodiments of the present invention especially when allowed to transport people in the carriages.

The present invention discloses a transport system comprising:
one or more grid of tracks or guide-ways [20L, 20R, 22L, 22R];
one or more vehicle units [100] with chassis including a wheel-axle assembly;
a central controller [101] in network communication with vehicle unit; and
one or more ingress and egress locations, and wheel axle assembly configured to be adapted in two different ways, described as adaptation 1 and adaptation 2.

In general, it is another aspect of the present invention to provide a transport system, wherein the guide-ways or tracks for switching vehicle in a vertical plane comprise:
a primary rail track with C shaped configuration [20R, 20L];
a secondary rail track with L-shaped configuration [22R, 22L]; and
one or more vertical ridge, one or more perpendicular edge flange along the inner sides and outer side of the track pair, a trigger point [21], a transition flange [24], and a switch point comprising trigger point [21],
wherein at the switch point there are two pairs of rails or tracks comprising primary and secondary rails,
wherein the secondary rail track has a smaller separation distance than the primary rail track, is fixed in horizontal gradient within the primary rail track at a switch point,
wherein secondary pair of rails or tracks are attached to the main pair of rails or tracks at the point of diverge or merge, the primary rail track and secondary rail track is fixed on rail support means, the perpendicular edge flange extends along the inner and outer sides of rail track, and
wherein the transition flange [24] extends horizontally from the left and right bottom of the primary rail track [20] and comprises the initial segment of the secondary rail track,
wherein a trigger point [21] is located along the primary track [20] at a predefined distance in advance to the transition flange [24], and wherein the rail track surfaces are provided with at least one vertical ridge to prevent wheels from derailing.

It is another aspect of the present invention to provide a transport system, wherein the secondary tracks [22] are provided at one or more switching node locations where it merges or diverges from primary tracks [20].

It is another aspect of the present invention to provide a transport system, wherein the tracks are populated with a series of wired or wireless chip devices or transponders at regular intervals as location markers or data exchangers.

It is another aspect of the present invention to provide a transport system, wherein the vehicles are powered by sliding contact with the tracks which are electrically charged.

It is another aspect of the present invention to provide a transport system, wherein the track configuration detection means detects the horizontal and vertical curvature of the tracks.

It is another aspect of the present invention to provide a transport system, wherein the transport system is rapid transport system running on elevated tracks.

It is another aspect of the present invention to provide a transport system, wherein the vehicle chassis configuration with a wheel-axle assembly comprises a pair of axles and each axle comprising a pair of main wheels [2W],
wherein the chassis [30] consisting of wheel axle assembly comprises a set of contractible axles fixed to the vehicle wheels [2W], and each axle enables movement of the wheels from the primary [20] to secondary track [22] for change in the trajectory or shift in vertical plane by withdrawing the wheels [2W] from extended position [E] to contracted position [C] or from contracted position [C] to extended position [E].

It is another aspect of the present invention to provide a transport system, wherein the scissor mechanism is configured symmetrically along the axle axis as well as the central plane of the chassis to symmetrically move the wheel blocks on either side in a contraction or expansion mode along the axle axis.

It is another aspect of the present invention to provide a transport system, wherein the central controller [101] comprises:
a network connected computer in communication with a hierarchy of network connected electronic nodes located along the tracks connected to the transponders;
a communication system comprising of wired and wireless network;
wherein the central computer contains a database of all transponders, location markers along the tracks and maintains real time data of location;
speed, acceleration of vehicle units; and
wherein the central computer communicates with the on-board vehicle, controller providing real-time instruction enabled control of vehicle unit,
wherein the central computer monitors and controls the inter-spacing of all running vehicles [100].

The wheel axle assembly has two adaptations, in the first adaptation or Adaptation 1 the
vehicle chassis configuration with a wheel-axle assembly comprises a pair of axles consisting a pair of main wheels [2WR, 2WL], one or more guide wheels [4iw, 4ow];
set of contractible axles [20] fixed to the vehicle wheels [2W] comprising of an axle linear slide [07] and an axle suspension frame [15], a pair of right slide [05] and left slide [06], wherein the inner guide wheels [4iw L,4iw R] are mounted on guide blocs [05, 06];
an in-wheel motor drive [01] paired with an in-wheel brake drive [03] on each axle;
the in-wheel motor drive [01] and the in-wheel brake drive [03] mounted on a pair of pneumatic wheels, one or more actuators [09];
a scissor mechanism assembly [11], each side of the axles comprising an electronic lateral distance sensor, a push pull shaft with link rod [10], a common axle linear slide [07] with guide blocks [05, 06], an electronic control means; and
wherein the two pairs of inner guide wheels [4iw] engage with the inner track vertical flange during and through the switching zone extended downwards by the linear motor actuators [09a],
an electronic control means,
wherein the linear motor actuator [09] is connected to a push and pull link rod [10] connected to one end of the front and rear scissor mechanism [11], and
wherein when the vehicle reaches a potential vertical trajectory change point along the track, an electronic sensor based trigger actuates a linear motor actuator [09] to push the connected link rod [10] between the pairs of scissor mechanisms [11] connected to the front and rear axle wheel blocks [05,06] to contract or expand the wheels and enable the shift in trajectory in vertical plane keeping the symmetric integrity of the mechanism between the left and right sides of the primary [20] and secondary tracks [22] via a shift from primary to secondary track and vice-versa.

It is another aspect of the present invention to provide a transport system, wherein the pair of slide guide blocks [05, 06] are fixed on each axle, a pair of outer guide wheels [4ow] fixed on wheel block pairs, a pairs of inner guide wheels [4iw] mounted on the wheel block pairs connected to a scissor assembly [11] further connected to an electrically powered linear motor actuator [09].

Source of Contraction and Expansion Force

It is another aspect of the present invention to provide a transport system, wherein the force from the electrically operated actuators makes the slide blocks [05,06] to contract and expand the vehicle track width, when the guide wheels [4iw] are lowered in place asynchronously, simply roll over the converging and diverging flange for guidance.

Method of Trajectory Change

It is yet another aspect of the present invention to provide a method for trajectory shift of a vehicle unit in a transport system, wherein the joining of the vehicle to the secondary track [22] from a primary track [20] comprises steps:
actuation of electronic sensor based trigger and front and rear linear motors to pull the connected scissor mechanism at the potential vertical trajectory change point and simultaneously lowering the two front and two rear linear motors in pairs asynchronously, thereby pulling the wheel blocks [05, 06] to contract the vehicle track width and to lower the pairs of inner guide wheels [4iw L] on the front and rear axle wheel blocks into a position asynchronously, where they start running on the inner edge flange of the track pair in the following order:
inner edge flange of the primary track;
inner horizontally graded edge flange of the transition track zone;
inner edge flange of the straight portion of the transition track zone;
inner edge flange of the vertically graded secondary track aligned in the same vertical plane, and
the contracting scissor mechanism forces the pair of rolling wheel blocks to contract and reduce its track width, the outward force of the scissor mechanism keeping all the outer guide wheels [4ow] and therefore the chassis [30] aligned centrally between the tracks pairs [20, 22] at all times throughout the transition zone [02] and after switching the tracks.

Reversibility

It is another aspect of the present invention to provide a method for trajectory shift of a vehicle unit in a transport system, wherein when joining the primary track [20] from a secondary track [22], the actions are reversed in order.

Outer Guide Wheels & Transition Zone

It is another aspect of the present invention to provide a transport system, wherein the pairs of outer guide wheels [4ow] mounted on the wheel block pairs [05, 06], run along the outer edge flange [26a] with expanded track width actuated and maintained by front and rear linear actuator [09 and 09].

Inner Guide Wheels & Expanding Contracting Force

It is another aspect of the present invention to provide transport system, wherein the contracting and expanding force along each of the axles is derived directly through the force exerted by 2 independent linear actuators [09] linked directly to the scissor mechanism [11] which transfers the forces through its links, necessarily asynchronously achieved using an electronic controller, through the graded part of transition area when the inner guide wheels [4iw] rollover the inner edge flange only for lateral guidance.

The wheel axle assembly has two adaptations, in another adaptation A2 the
vehicle chassis configuration with a wheel-axle assembly comprises a pair of axles consisting a pair of main wheels [2WR, 2WL], one or more guide wheels [4iw, 4ow];
set of contractible axles [20] fixed to the vehicle wheels [2W], comprising of an axle linear slide [07] and an axle suspension frame [15], a pair of right slide [05] and left slide [06];
wherein the inner guide wheels [4iw] are mounted on guide blocs [05, 06], a pair of wheel blocks comprising right slide guide block [05] and left slide guide block [06], contractor guide linear slide [08], compressed spring [12] and a swinging arm hinge [13];
wherein the inner guide wheels are mounted on swinging arms hinge which is itself mounted the wheel block pairs [05,06];
an in-wheel motor drive [01] paired with an in-wheel brake drive on each axle; a single linear motor actuator [09] connected to push and pull link rod [10] further connected to the front and rear swing arms of the guide wheels through a swing synchronizer sliding push rod [13];
a set of compression springs [12] that hold the wheel block pairs [05, 06] in an expanded position at all times;
a scissor mechanism assembly [11];
a scissor guide linear slide [08];
a set of horizontal electronic distance sensors [17];
a push-pull shaft with link rod [10]; an axle guide blocks linear slide [07]; and an electro-mechanical linear actuator [09]; an electronic control means,
wherein the inner guide wheels [4iw] are hinged to the guide blocks [05, 06], wherein the contraction and expansion of track-width is enabled by the inner guide wheels where the forces required to do so along the axle is derived from inner guide wheels rolling [4iw] over the converging or diverging edge flange [26] when actuated into the required position using a single linear motor actuator [09] and related electronic controls, wherein asynchronous contraction and expansion of the front and rear axles is made possible using the swing synchronizer sliding push rod [13] enabling the front and rear swing inner guide wheel arms to contract and expand differentially automatically, wherein the expanding forces from the compressed springs [12] between the wheel block pairs [05, 06] keeping the vehicle continuously aligned along the central plane between the track pairs at all times, and wherein the safe central trajectory is automatically offered integrally by design without need to maintain synchronicity between front and rear axles.

It is another aspect of the present invention to provide a transport system, wherein the pair of slide guide blocks [05, 06] are fixed on each axle, a pair of outer guide wheels [4ow-] fixed on wheel block pairs, a pairs of inner guide wheels [4iw] mounted on the wheel block pairs by a hinge or hinged to the wheel block pairs [05, 06] chained together to transmit the force required for contraction and expansion, the wheel block pairs [05,06] further connected to a scissor assembly [11] for maintaining symmetricity.

Source of Contraction and Expansion Force

It is another aspect of the present invention to provide a transport system, wherein the rolling inner track guides through the converging and diverging flange forces the inner track guide wheels [4iw] to contract and expand the vehicle track-width, when swung in place by using the single actuator [09] while all asynchronous front and rear axle movements is achieved by the track configuration itself.

Method of Trajectory Change

It is yet another aspect of the present invention to provide a method for trajectory shift of a vehicle unit in a transport system, joining the secondary track [22] from a primary track [20] comprising of steps:

Actuation of electronic sensor based trigger and linear motor to push the connected link rod at the potential vertical trajectory change point between the pairs of guide wheels on the front and rear axle wheel blocks to swing the guide wheels into a position where they start running on the inner edge flange of the track pair in the following order:

inner edge flange of the primary track;

inner horizontally graded edge flange of the transition track zone; followed by inner edge flange of the straight portion of the transition track zone inner edge flange of the vertically graded secondary track aligned in the same vertical plane;

converging grade of the inner edge flange forces the pair of rolling wheel blocks to contract and reduce its track width; and compressing the springs [12] between the wheel blocks [5, 6] the outward force of the compressed springs [12] keep all the guide wheels and therefore the chassis aligned centrally between the tracks pairs [20, 22] at all times throughout the transition zone and after switching the tracks.

Reversibility

It is another aspect of the present invention to reversibly provide a method for trajectory shift of a vehicle unit in a transport system, wherein when joining the primary track [20] from a secondary track [22], the diverging grade of the inner edge flange eases the compressed springs [12] between the wheel blocks when the guide wheels [4iw] roll along the diverging inner edge flange.

Outer Guide Wheels & Transition Zone

It is another aspect of the present invention to provide a method for trajectory shift of a vehicle unit in a transport system, wherein outer guide wheels [4ow] remain engaged with the outer edge flange [26a] at all times, under the expansive forces of the compression springs [12], except during the process of contraction or expansion through the transition zone [02] to be able to roll into the inner track pair [22] where again they engage with the outer edge flange of the inner track pair[26a].

Inner Guide Wheels & Expanding Contracting Force

It is another aspect of the present invention to provide a transport system, wherein the contracting and expanding force along each of the axles is derived directly through the force exerted by the inner track guide wheels rolling over the inner flange of the track, linked directly to the scissor mechanism which transfers the forces through its links, automatically asynchronously through the graded part of transition area when the inner guide wheels rollover the inner edge flange.

Features Common to Both Adaptations:

It is an aspect of the present invention to provide a transport system, wherein the pairs of outer guide wheels [4ow] mounted on the wheel block pairs, normally run along the outer edge flange [26a] with expanded track width.

It is another aspect of the present invention to provide a method for trajectory shift of a vehicle unit in a transport system, wherein outer guide wheels [4ow] remain engaged with the outer edge flange at all times, under the expanded position, except during the process of contraction or expansion through the transition zone [02] to be able to roll into the inner track pair where again they engage with the outer edge flange [26a] of the inner track pair.

It is another aspect of the present invention to provide a transport system, wherein the horizontal curved path trajectory when required is determined by the lateral electronic distance sensors [17] for each sides of the axles and electronically controlled through the left and right wheels [2W] differential speed controller.

It is another aspect of the present invention to provide a transport system, wherein the in-wheel motor drive [01] and in-wheel brake drive [03] are enabled in alternate or swapped configuration.

BRIEF DESCRIPTION OF DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawing, which form a part of this specification. It is to be noted, however, that the drawing illustrates only a preferred embodiment of the invention and is therefore not to be considered limiting of the invention's scope as it may admit to other equally effective embodiments.

AA—Primary and secondary tracks fully diverged
BB—Primary and secondary tracks partially diverged
CC—Primary and secondary tracks starting to diverge DD—Primary Track with fully extended Horizontal flange
EE—Primary Track with partially extended horizontal flange
FF—Primary Track
w=track frame width, h-track frame height, primary track outer width, b-primary track separation distance, c-secondary track separation distance. The tracks are raised on pillars [29], firmly affixed in pillar anchorage [33].

FIGS. 2-13: Illustrates embodiments for wheel axle assembly comprising of Adaptation 1.

FIGS. 16-25: Illustrates embodiments for wheel axle assembly comprising of Adaptation 2.

Figure 2:
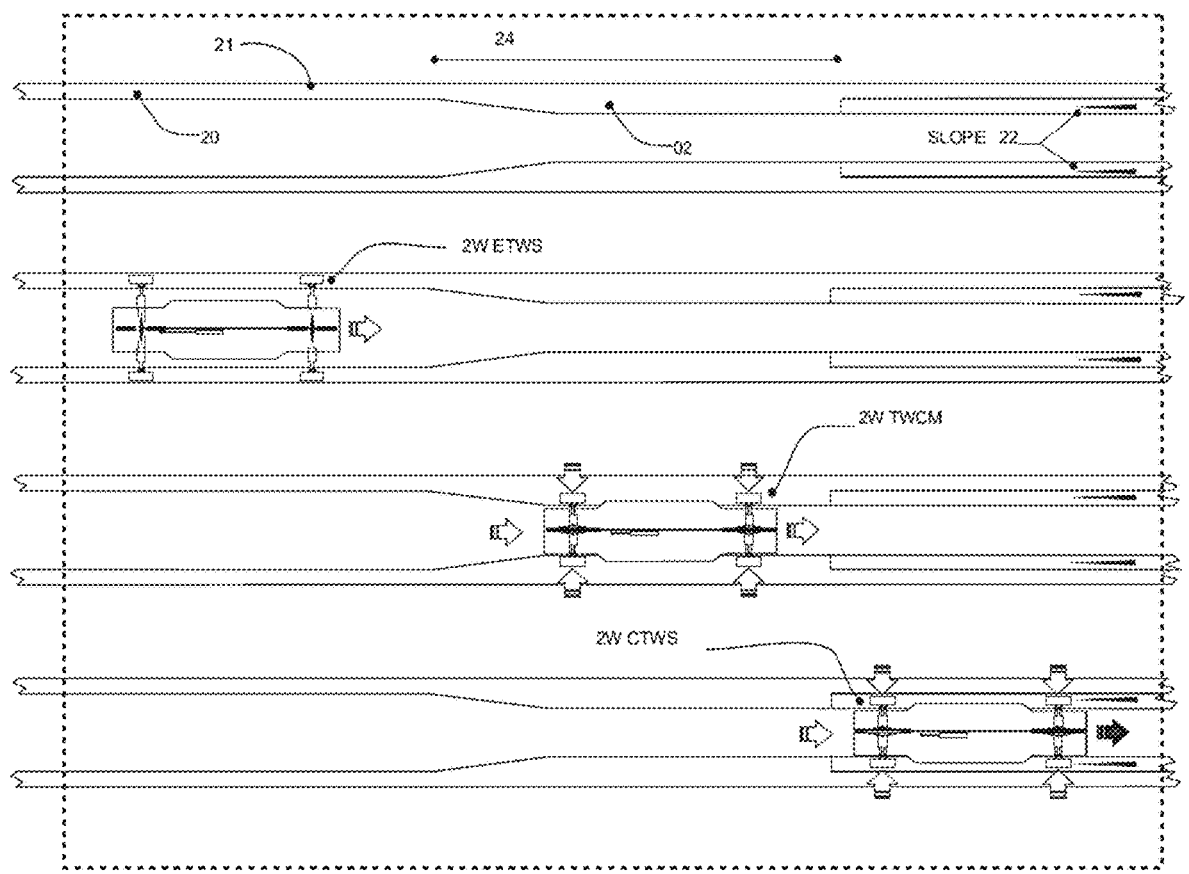

FIG. 2 illustrates chassis configuration during vehicle transition from primary track to secondary track general arrangement. It illustrates the vehicle moving from the primary [20] to the secondary tracks [22] with vehicle wheel track width wheels in fully expanded condition in primary track and fully contracted condition in secondary track passing through the transition zone with front and rear axles contracting in sequence.

2W Expanded Track Width Status [2W ETWS]
2W Track Width Contraction Mode [2W TWCM]
2W Contracted Track Width Status [2W CTWS]

Figure 3:
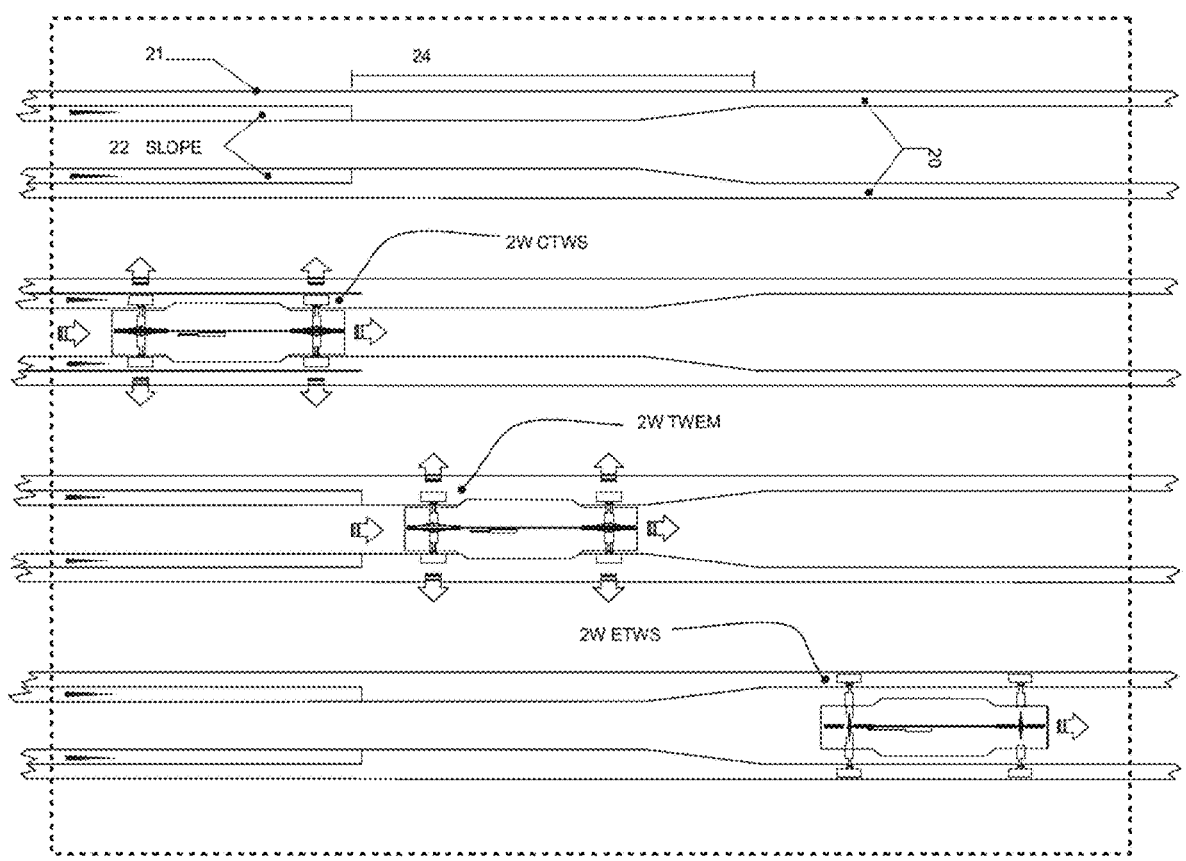

FIG. 3 illustrates chassis configuration of an embodiment of the present invention as adaptation 1, during vehicle transition from secondary track to primary track. Illustrates the vehicle unit [100] moving from the secondary tracks [22] to the primary tracks [20] with track width in fully contracted condition in secondary track and fully expanded condition in primary track passing through the transition zone with front and rear axles expanding in sequence.

2W Contracted Track Width Status [2W CTWS]
2W Track Width Expansion Mode [2W TWEM]
2W Expanded Track Width Status [2W ETWS]

Figure 4:
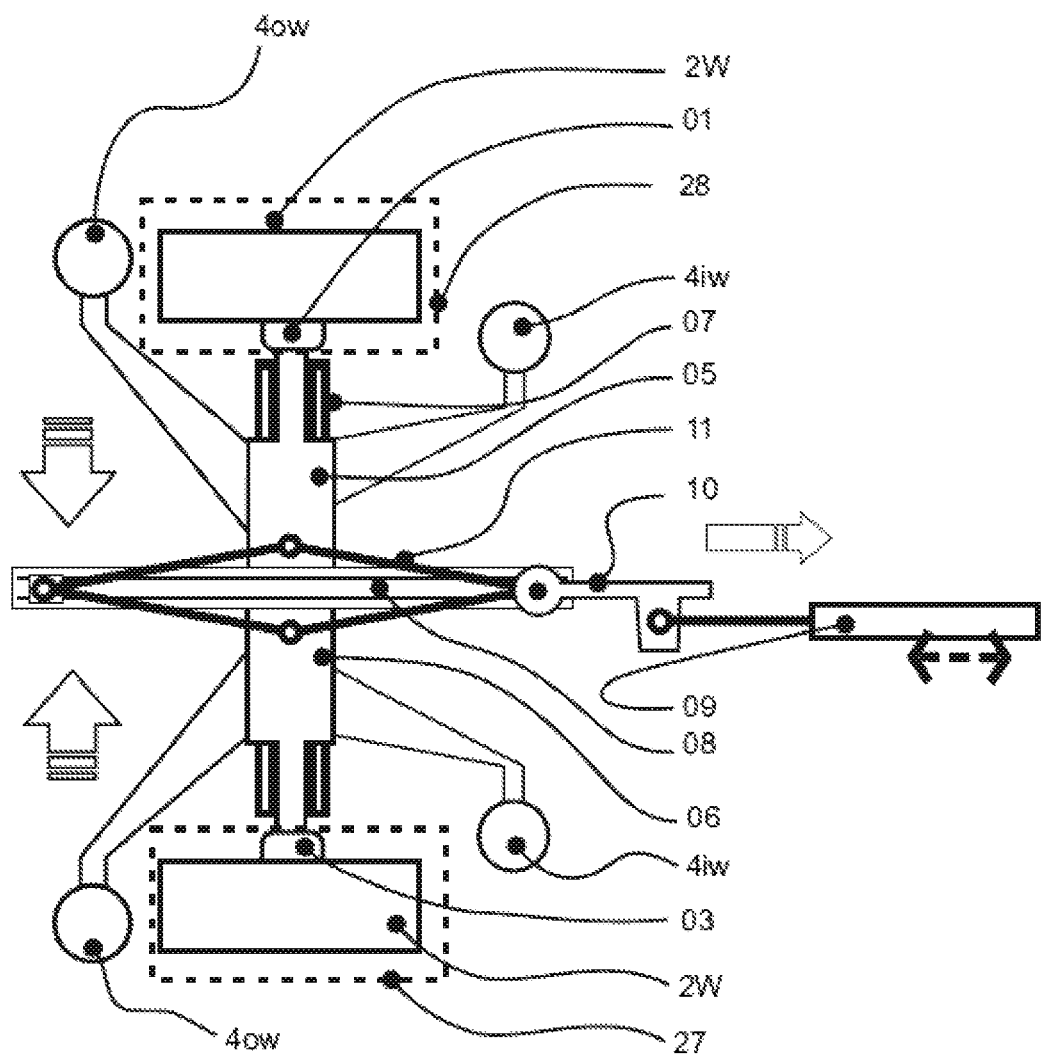

FIG. 4 illustrates the axle under contraction [C] with actuated linear motor driven scissor assembly contraction of track width with the inner track guide wheels [4iw L] lowered into a position for guidance from the inner track edge flange [26]. The outer guide wheels running on outer track edge flange [26a].

Figure 5:
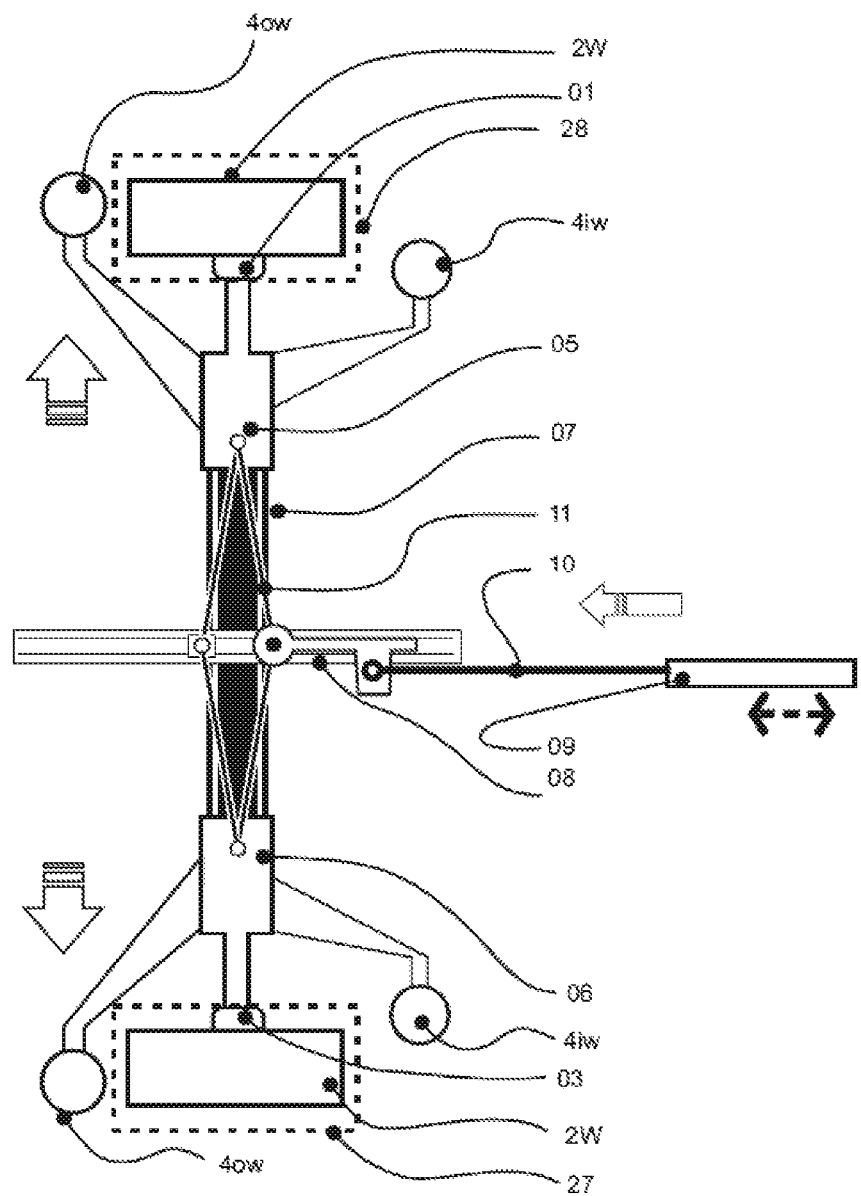

FIG. 5 illustrates the axle under expansion [E] with actuated linear motor driven scissor assembly expansion of track width with the inner track guide wheels [4iw L] raised into a position for clearing the inner track flange [26]. The outer guide wheels running on outer track edge flange [26a].

Figure 6:
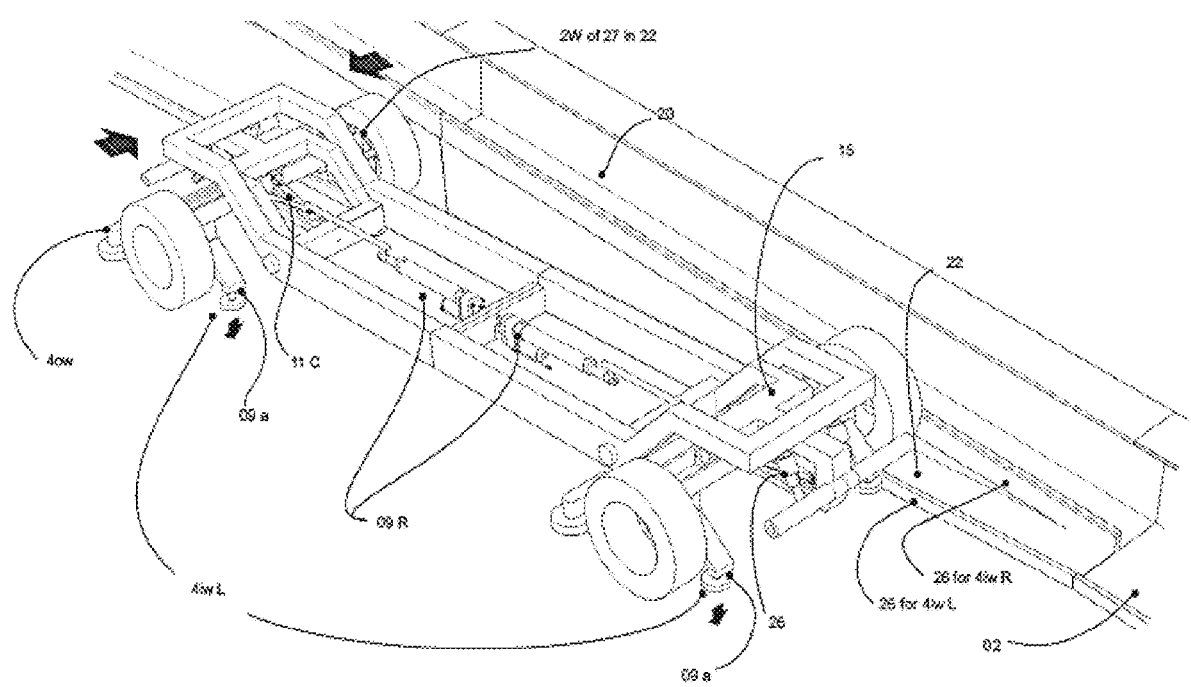

FIG. 6 illustrates chassis configuration with the axle in contracted [C] position when inside secondary track [22]. 2W of 27 in 22 illustrates wheel assembly 2W with in wheel brake assembly [27] in contracted position in the secondary track [22]. Shock spring [33] between chassis [30] and axle suspension frame [15]. Inner guide wheel [4iw L] lowered to engage with inner track edge flange [26] and contractor scissor [11] in contracted position.

Figure 7:
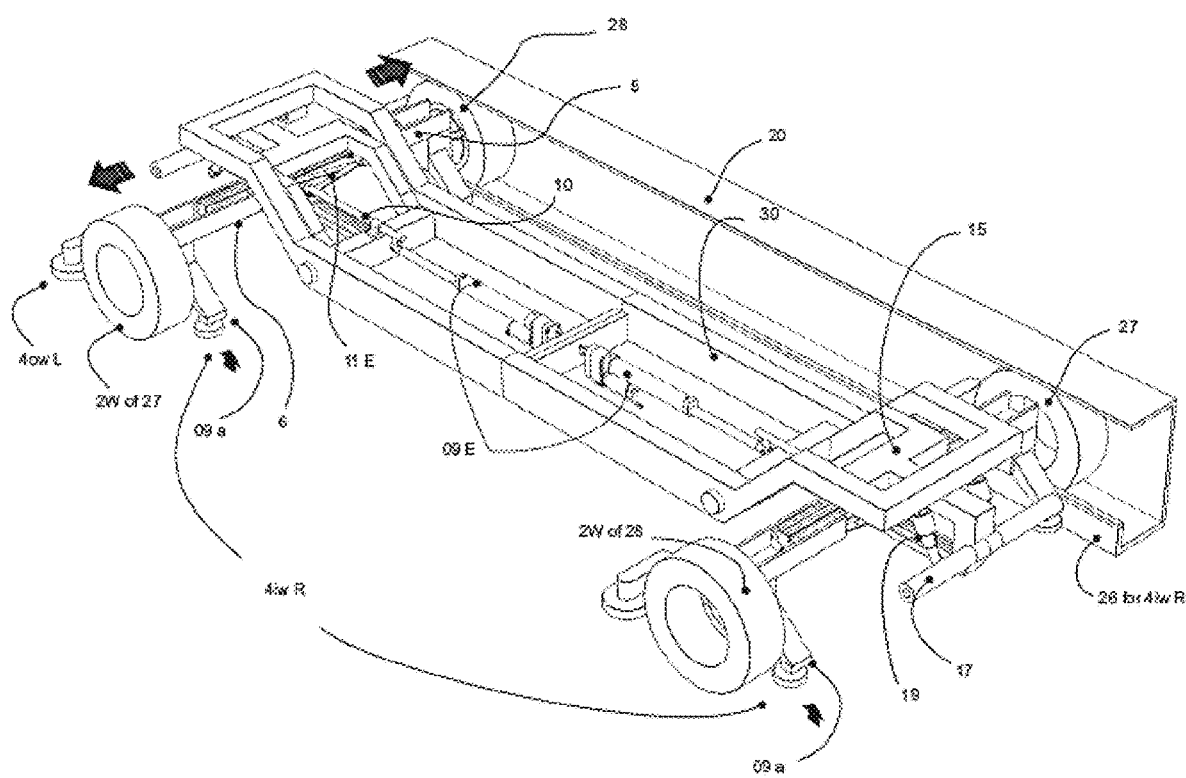

FIG. 7 illustrates chassis configuration with the axle in expanded [E] position when within primary track [22] 2W of 28 in 22 illustrates wheel assembly 2W with in wheel brake assembly [28] in expanded position in the primary track [22]. Shock spring [33] between chassis [30] and axle suspension frame [15]. Inner guide wheel [4iw R] lowered to disengage with inner track edge flange [26] and contractor scissor [11] in expanded position.

Figure 8:
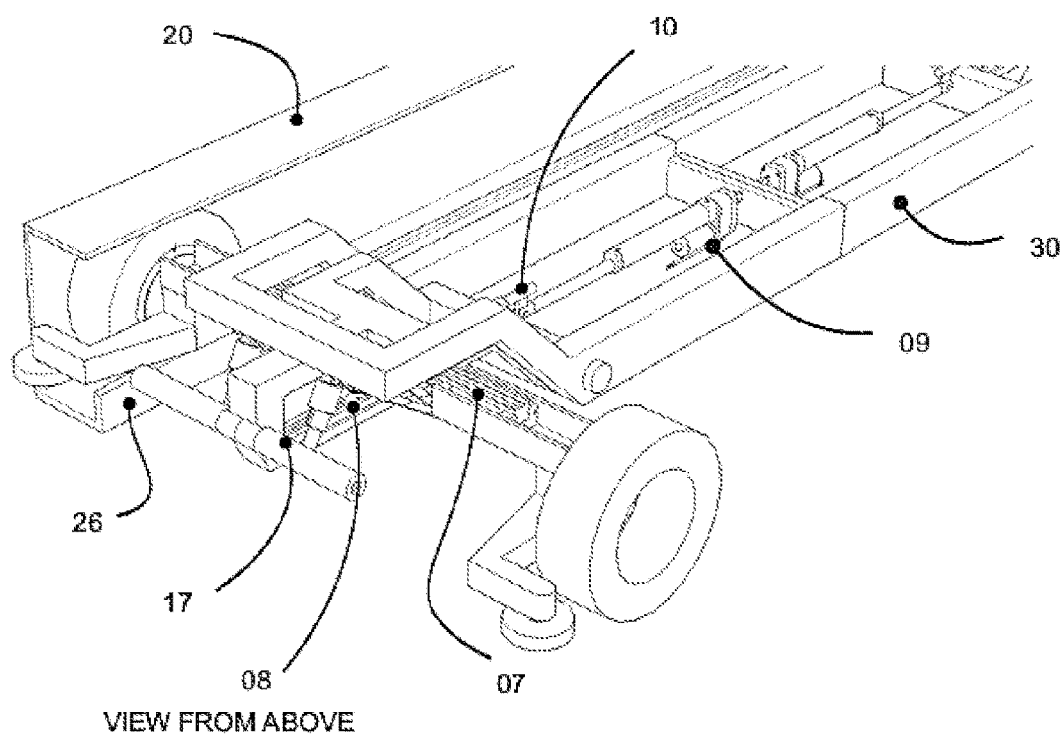

FIG. 8 illustrate the configuration of primary track, chassis, suspension frame and allied axle components viewed from above. Also depicts horizontal electronic side distance sensors [17].

Figure 9:
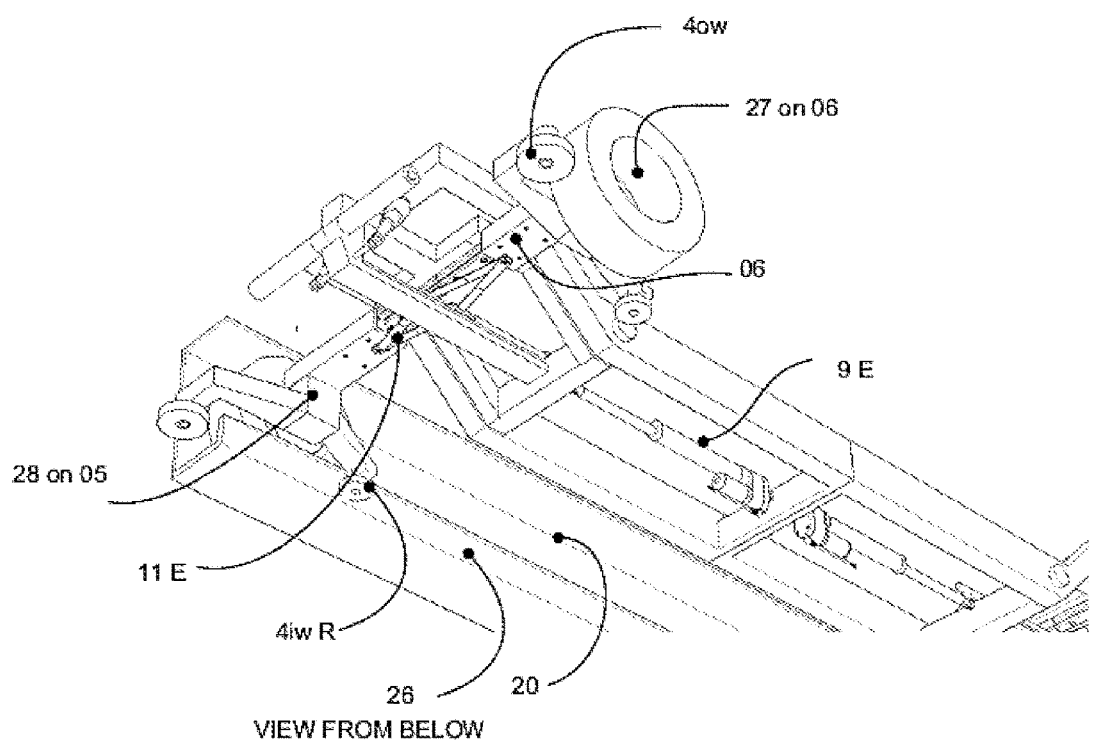

FIG. 9 illustrate the configuration of primary track, chassis, suspension frame and allied axle components viewed from below.

Figure 10:
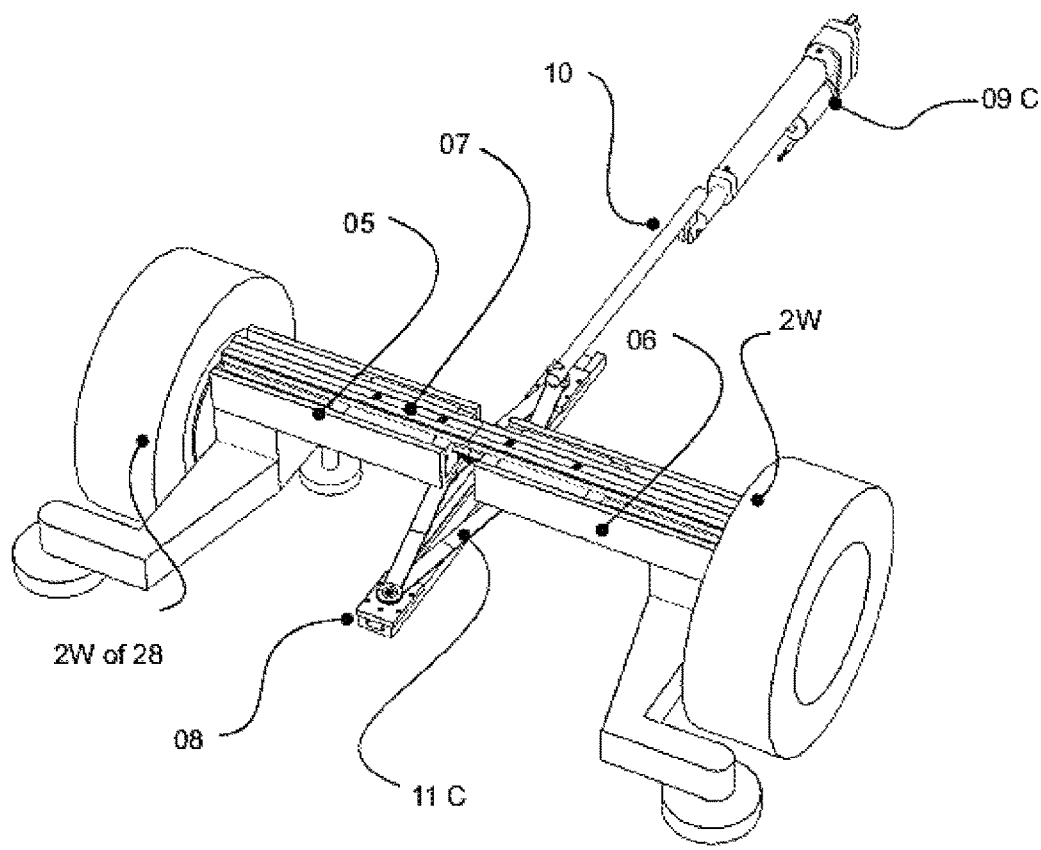

FIG. 10 illustrates the configuration of the axle components viewed from above depicting in-wheel motor assembly and in-wheel brake assembly mounted on axle slide blocks [05, 06] viewed from above. 28 on 05 illustrates the in-wheel motor assembly [28] mounted on the right-hand slide block, and 27 on 06 illustrates in-wheel brake assembly [27] mounted on left-hand sliding guide block [06]. Scissor assembly [11] in contracted and linear motor [09 R] in retracted position.

Figure 11:
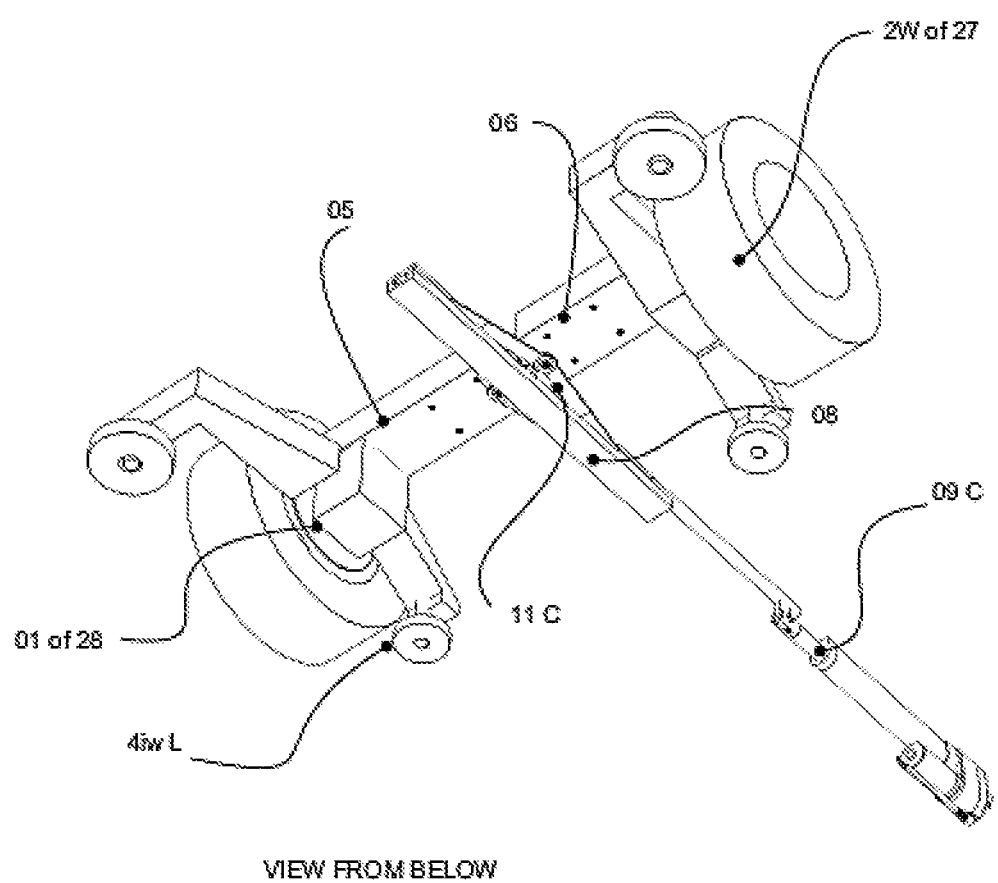

FIG. 11 illustrates the configuration of the axle components viewed from below with scissor assembly [11] in contracted and linear motor [09 R] in retracted position.

Figure 12:
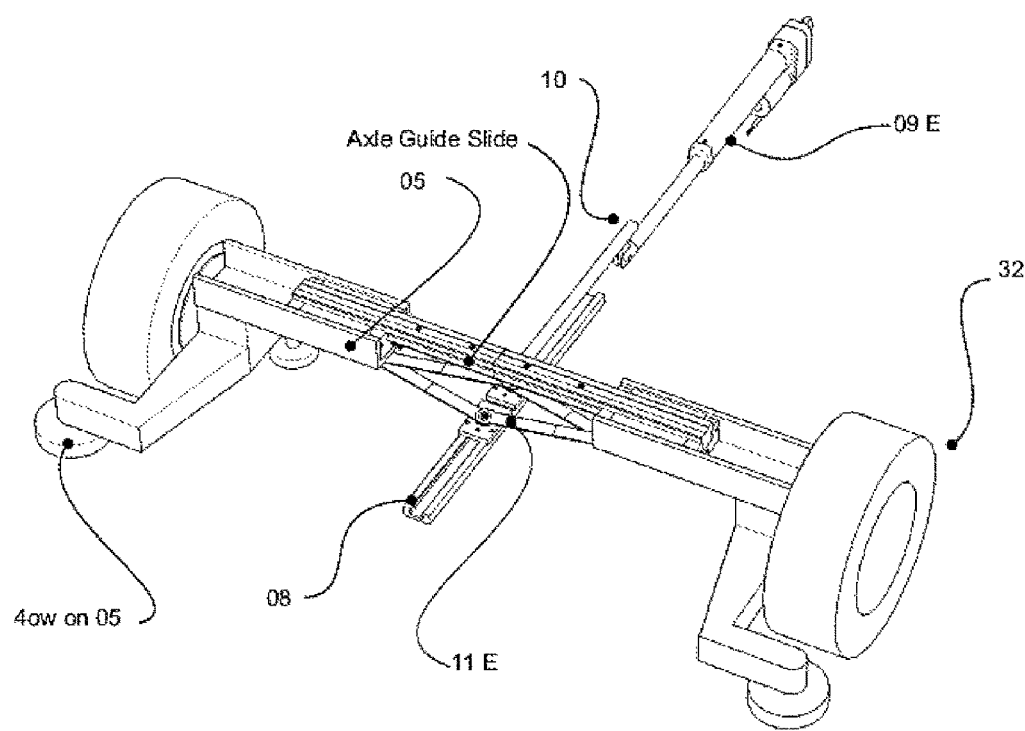

FIG. 12 illustrates the configuration of axle components viewed from above in expanded position. 28 on 05 illustrates the in-wheel motor assembly [28] in the right hand slide block, and 27 on 06 illustrates In wheel brake assembly [27] in left hand sliding guide block [06] with a expanded scissor mechanism [11 E] and a expanded actuator [09-E].

Figure 13:
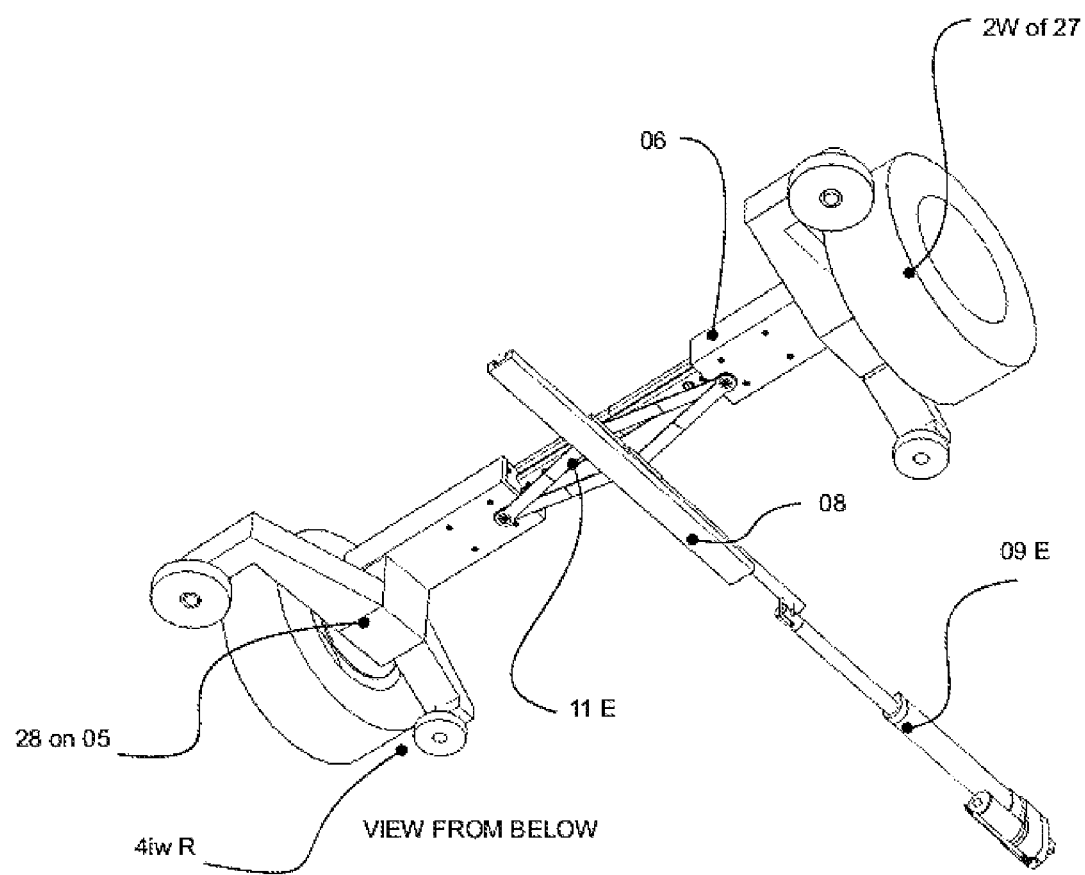

FIG. 13 illustrates the configuration of the axle components viewed from below with scissor assembly [11 E] in expanded and linear motor [09 E] in expanded position.

Figure 14:
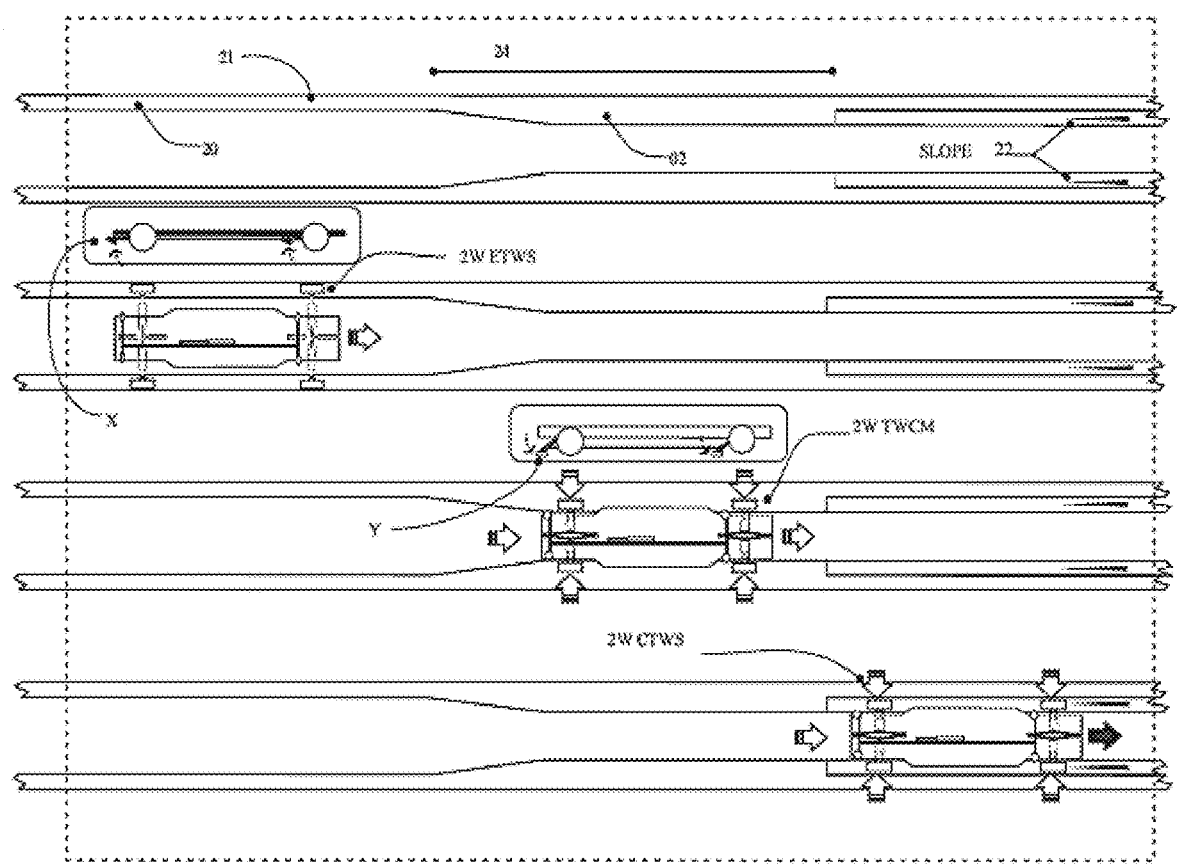

FIG. 14 illustrates chassis configuration during vehicle transition from primary track to secondary track general arrangement. It illustrates the vehicle moving from the primary [20] to the secondary tracks [22] with vehicle wheel track width in fully expanded condition in primary track and fully contracted condition in secondary track passing through the transition zone with front and rear axles contracting in sequence.

2W Expanded Track Width Status [2W ETWS]
2W Track Width Contraction Mode [2W TWCM]
2W Contracted Track Width Status [2W CTWS]

Figure 15:
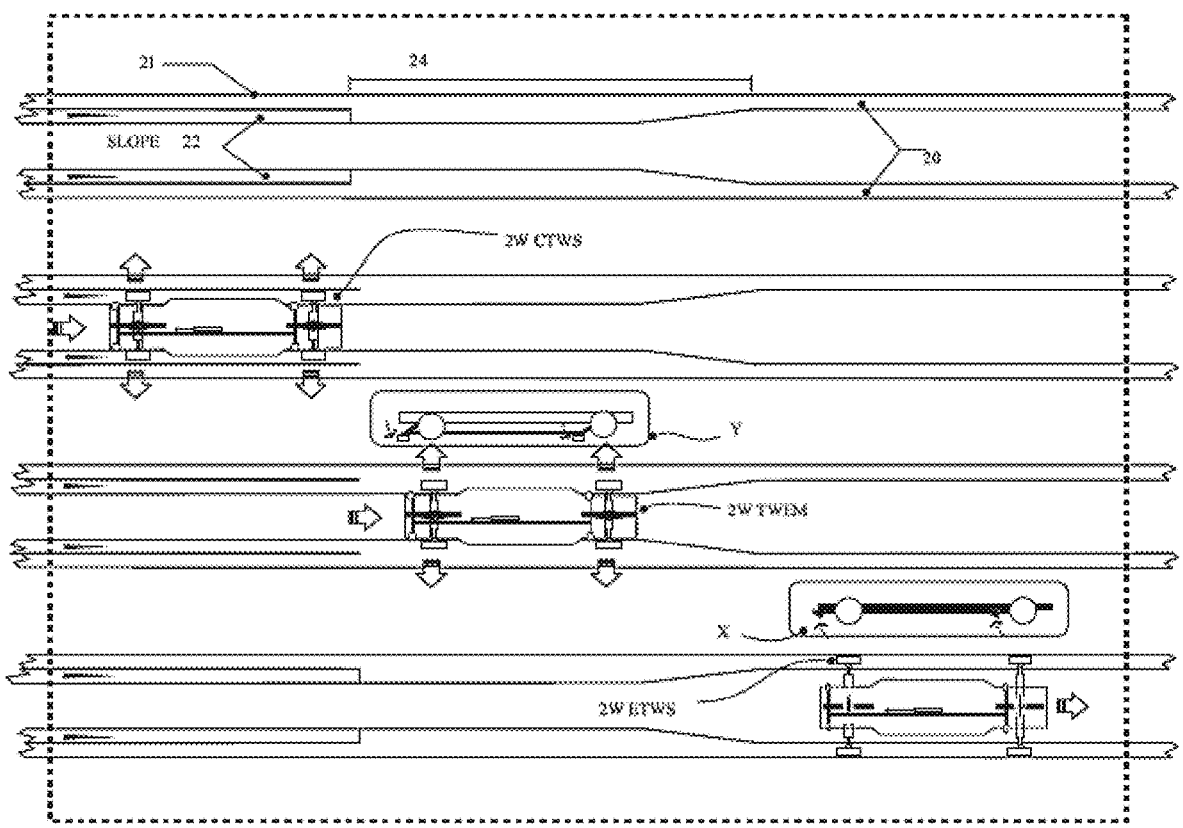

FIG. 15 illustrates chassis configuration of an embodiment of the present invention—vehicle transition from secondary track to main/primary track. Illustrates the vehicle unit [100] moving from the secondary tracks [22] to the primary tracks [20] with track width in fully contracted condition in secondary track and fully expanded condition in primary track passing through the transition zone with front and rear axles expanding in sequence.

2W Contracted Track Width Status [2W CTWS]
2W Track Width Expansion Mode [2W TWEM]
2W Expanded Track Width Status [2W ETWS]

Figure 16:
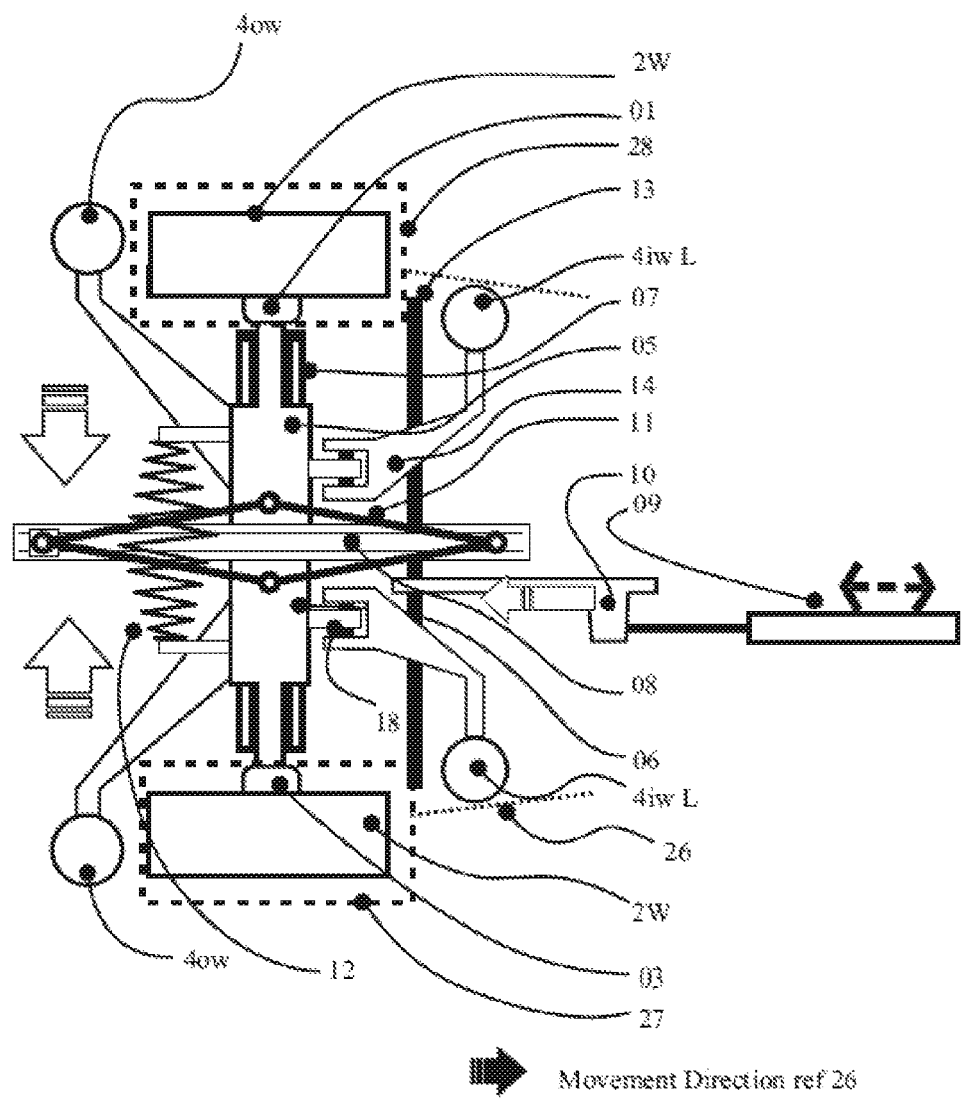

FIG. 16 illustrates the axle under contraction [C] with actuated linear motor driven inner track guide wheels [4iw] lowered into a position being pushed inside reactively by converging inner edge flange [24] against the forces of the expansion spring [12].

Figure 17:
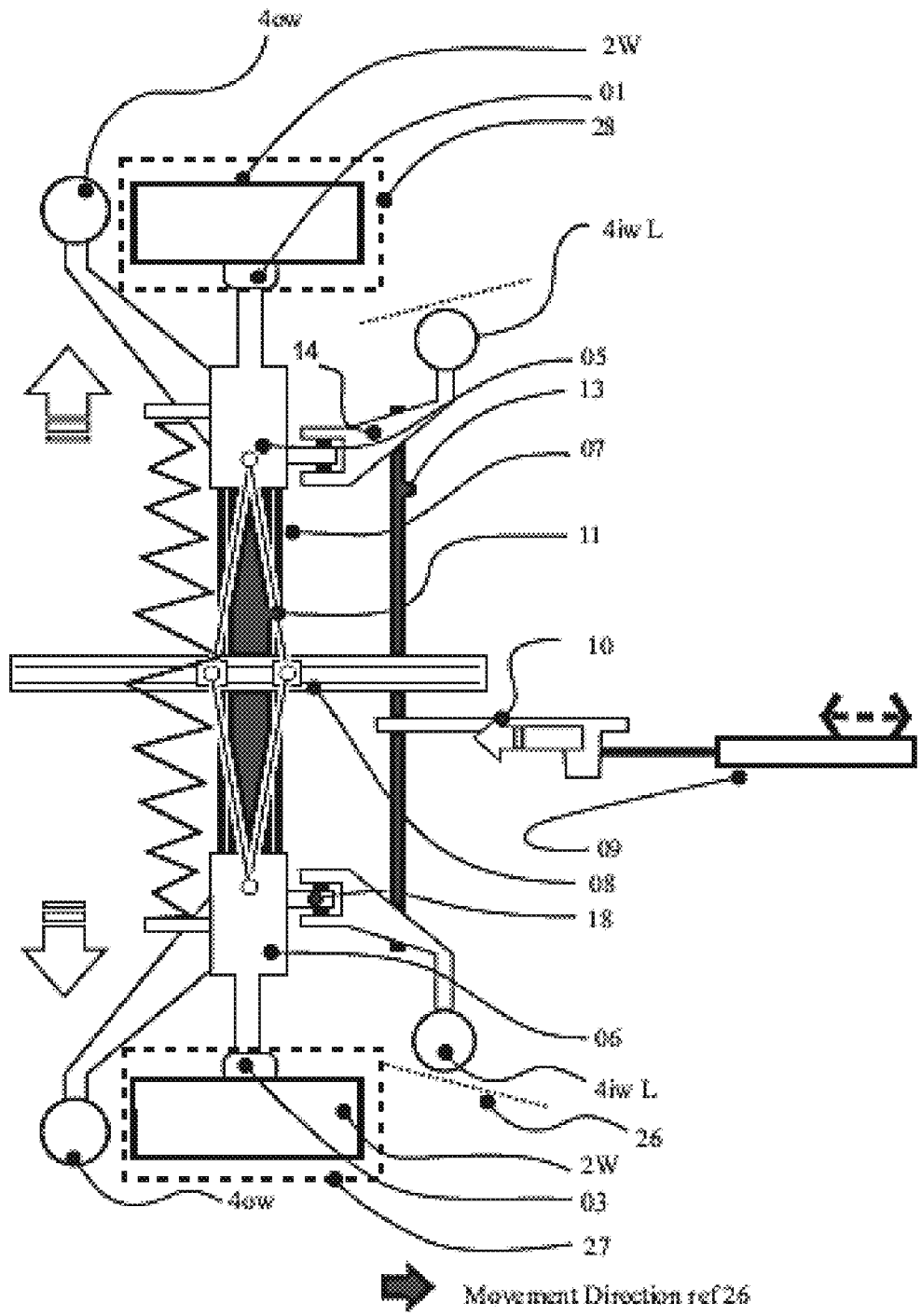

FIG. 17 illustrates the axle under expansion [E] with actuated linear motor driven inner track guide wheels [4iw] lowered into a position being pushed outside reactively by diverging inner edge flange [26] with the forces of the expansion spring [12].

Figure 18:
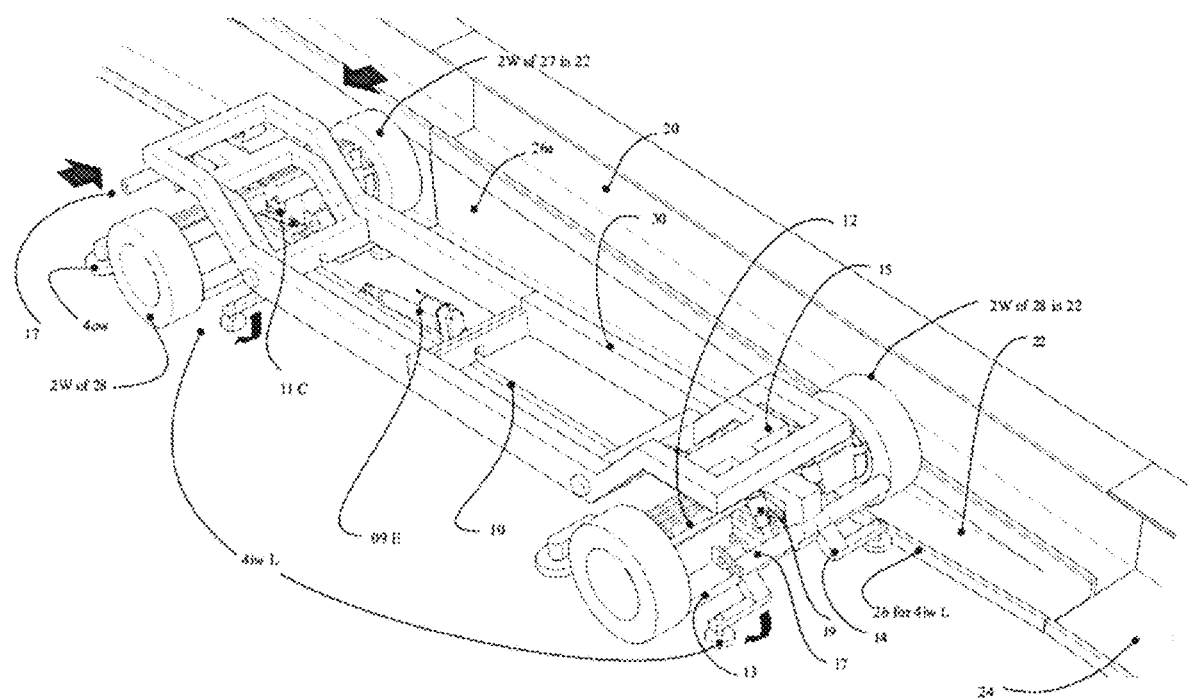

FIG. 18 illustrates chassis configuration with the axle in contracted position [C] when inside secondary track [22], the inner guide wheels [4iw] swung down or lowered to engage with inner track edge flange [26] and contractor scissor [11] in contracted position.

Figure 19:
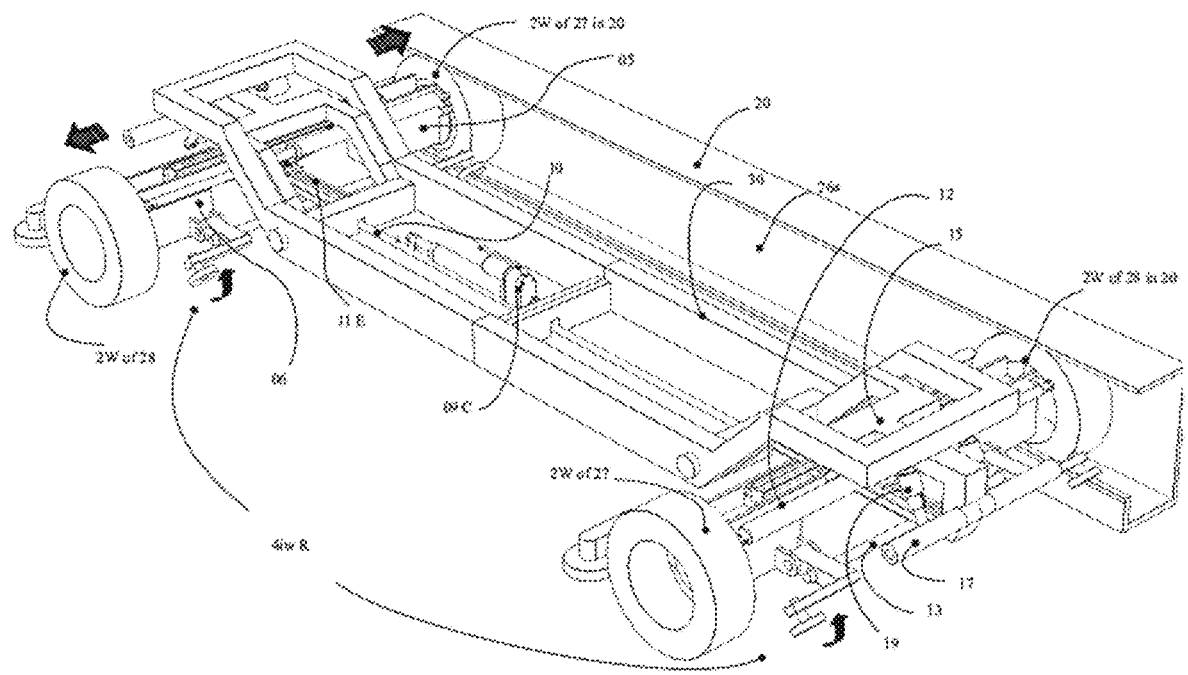

FIG. 19 illustrates chassis configuration with the axle in expanded position when within primary track [20], depicts inner guide wheel [4iw] swung up or raised to disengage with inner track edge flange [26] and contractor scissor [11] in expanded position.

Figure 20:
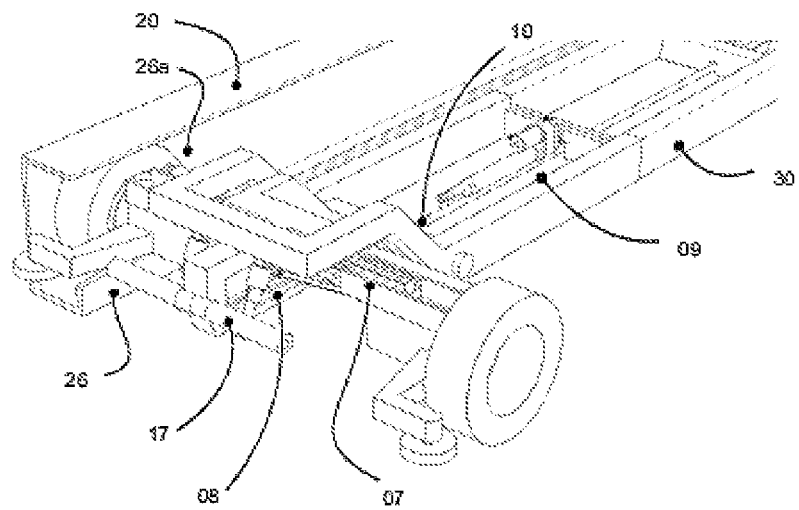

FIG. 20 illustrates chassis configuration of primary track chassis, suspension frame and allied axle components viewed from above. Also depicts horizontal electronic side distance sensors [17].

Figure 21:
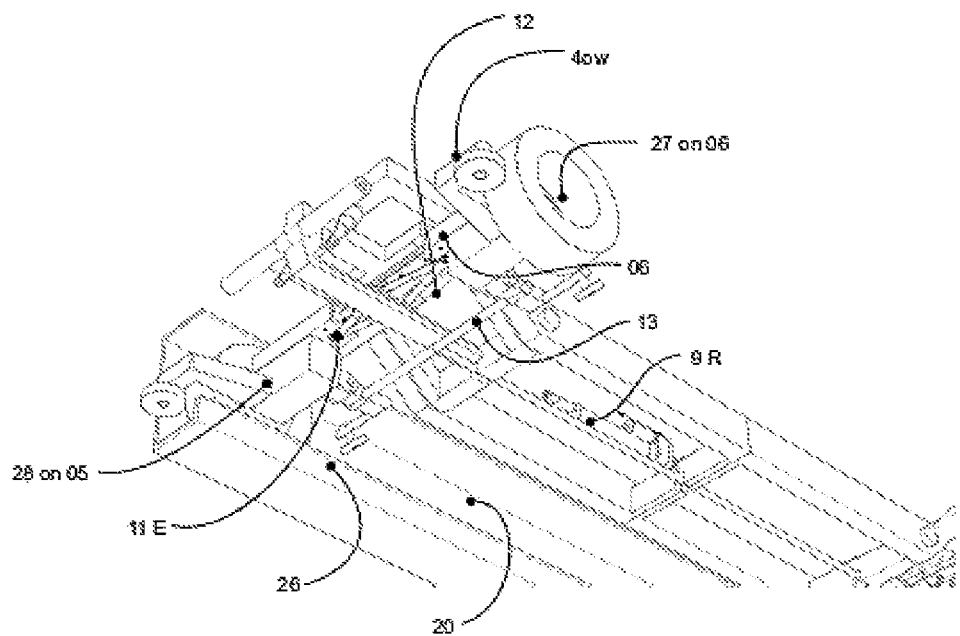

FIG. 21 the configuration of primary track, chassis, suspension frame and allied axle components viewed from below depicting in-wheel motor assembly and in-wheel brake assembly mounted on axle slide blocks 05, 06, viewed from below. 28 on 05 illustrates the in-wheel motor assembly [28] mounted on the right-hand slide block, and 27 on 06 illustrates in-wheel brake assembly [27] mounted on left-hand sliding guide block [06].

Figure 22:
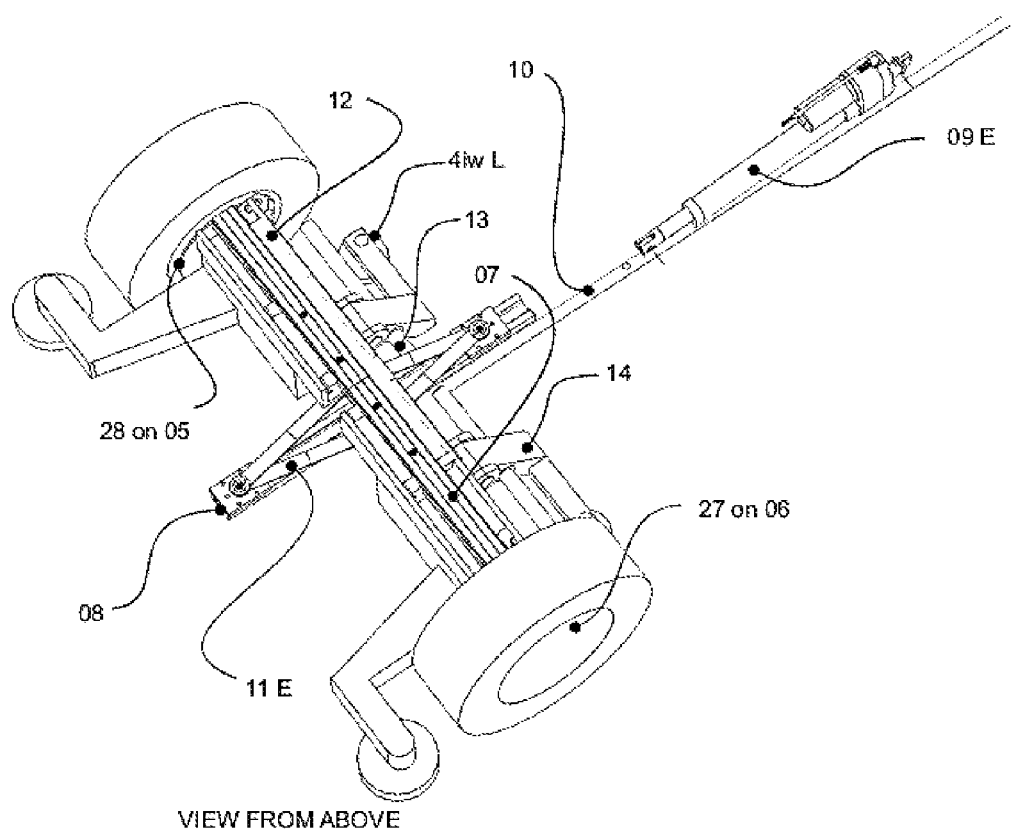

FIG. 22 illustrates chassis configuration of axle components viewed from above in contracted position. 28 on 05 illustrates the in-wheel motor assembly [28] in the right hand slide block, and 27 on 06 illustrates In wheel brake assembly [27] in left hand sliding guide block [06], with scissor assembly [11 C] in contracted and linear motor [09 R] in expanded position.

Figure 23:
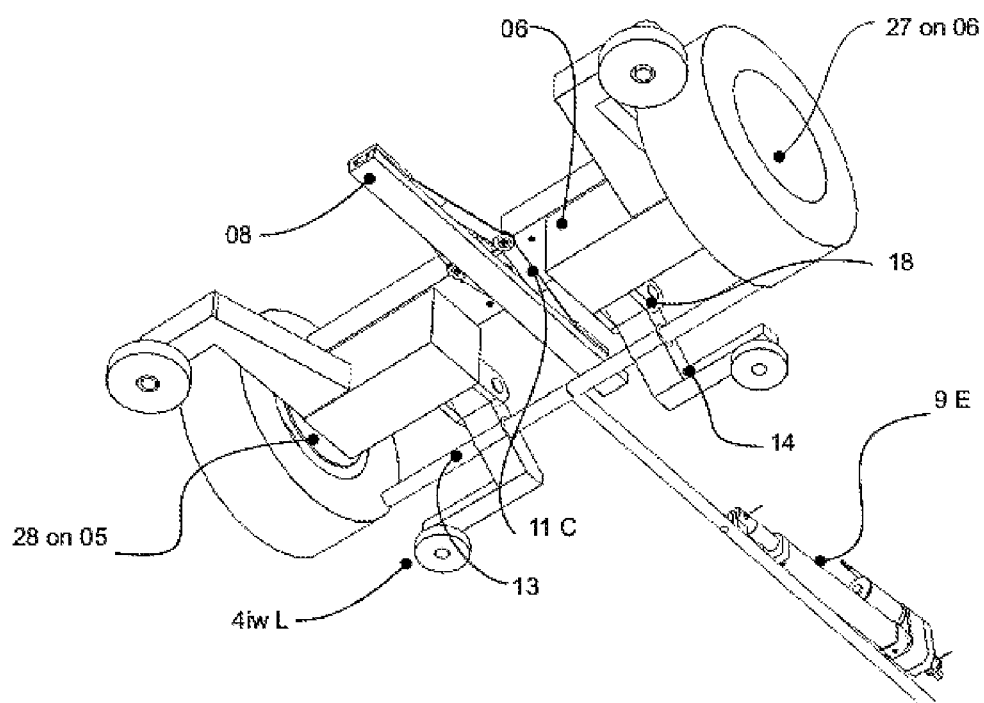

FIG. 23 illustrates chassis configuration of axle components viewed from below in contracted position, with scissor assembly [11 C] in contracted and linear motor [09 R] in expanded position.

Figure 24:
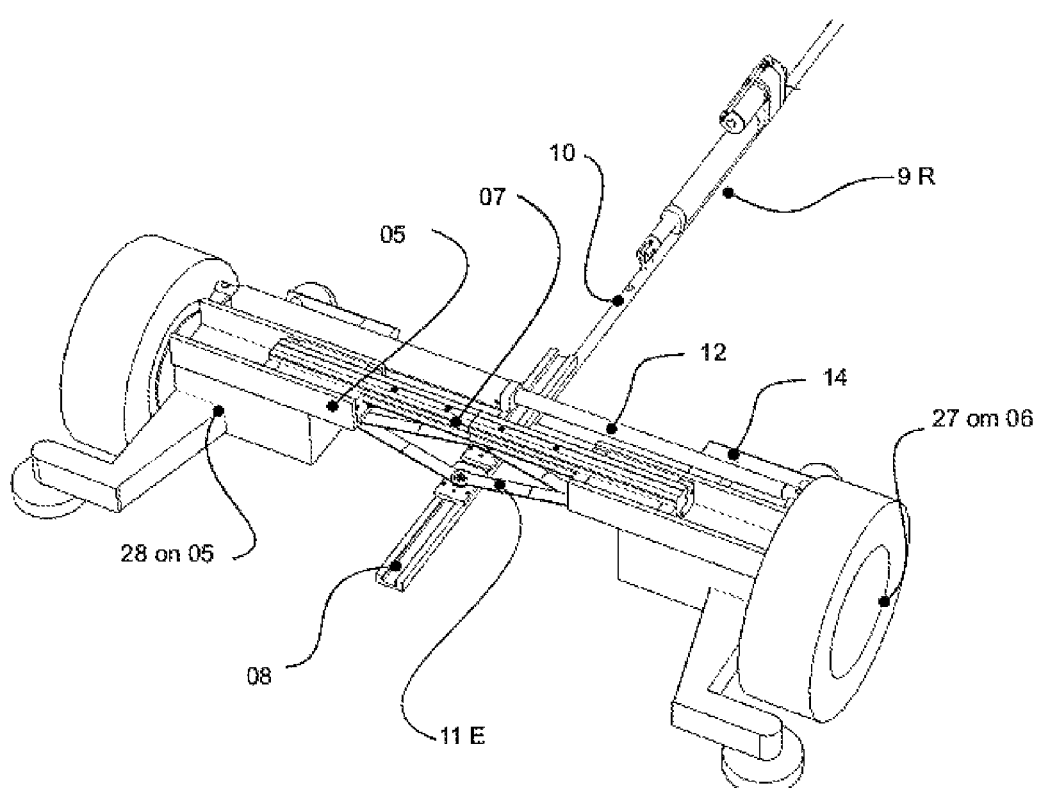

FIG. 24 illustrates chassis configuration of axle components viewed from above in expanded position with [28] is the in wheel motor assembly on right side guide block [05], in wheel brake assembly [27] mounted on left side guide block [06], with scissor assembly [11 E] in expanded and linear motor [09 R] in retracted position.

Figure 25:
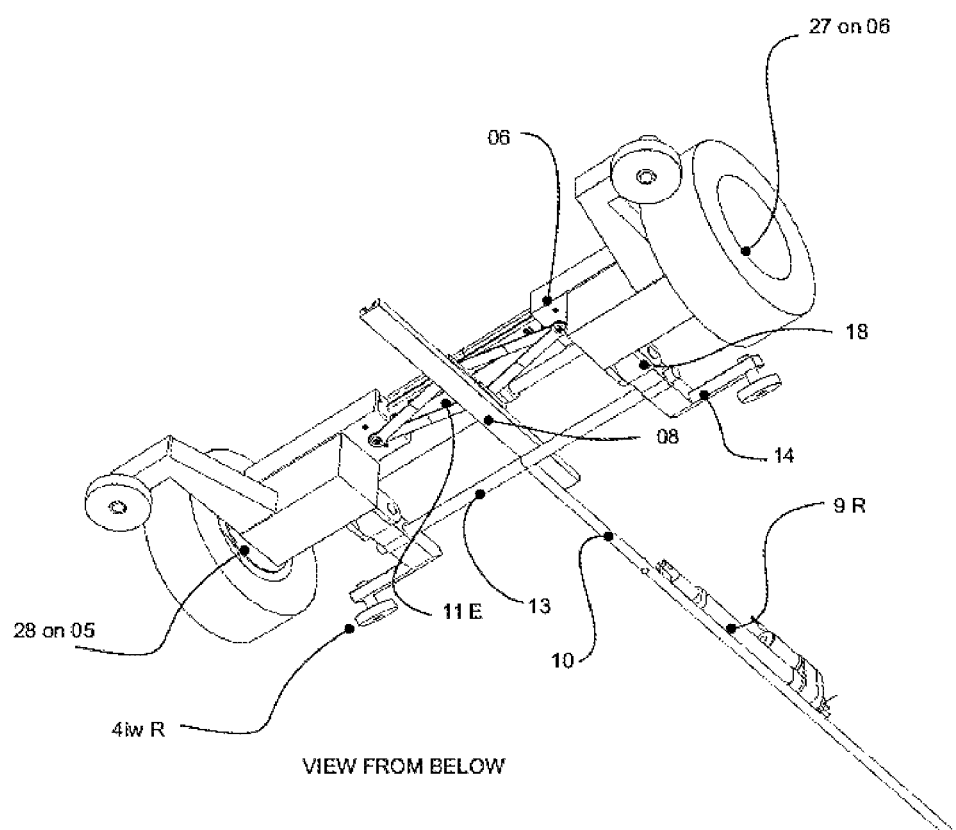

FIG. 25 illustrates chassis configuration of axle components viewed from below in expanded position with scissor assembly [11 E] in expanded and linear motor [09 R] in retracted position.

DESCRIPTION OF DRAWINGS WITH REFERENCE NUMERALS

[100] One or more vehicle units on primary track
[100a] Vehicle on the secondary track
[101] A central controller
[01] In-wheel motor drive
[02] Transition zone
[2W] Main wheels or vehicle wheels
[2W TWEM] Main wheels track width expansion mode
[2W TWCM] Main wheels track width contraction mode
[2W ETWS] Main wheels expanded track width status
[2W CTWS] Main wheels contracted track width status
[03] In-wheel brake drive
[4iw, 4ow] Guide wheels
[4iw, 4iw] Pair of inner guide wheels
[4iw L] Inner guide wheels lowered
[4iw R] Inner guide wheels raised
[4ow, 4ow] Pair of outer guide wheels
[05] Right sliding guide block
[06] Left sliding guide block;
[07] Axle guide blocks linear slide
[08] Scissor guide linear slide,
[09] Linear motor actuator,
[09-R] Actuator retracted
[09-E] Actuator expanded
[10] Push pull shaft with link rod
[11] Scissor mechanism assembly
[11-C] Scissor mechanism contracted
[11-E] Scissor mechanism expanded
[12] Compressed springs
[13] Swing synchronizer sliding push rod
[14] Swing arm
[15] Axle suspension frame
[17] Horizontal electronic distance sensors
[18] Swing arm hinge
[19] Suspension shock absorbers
[20] Primary track
[20L, 20R] Primary tracks or guide-ways with C shaped configuration
[21] Trigger point
[22] Secondary track
[22L, 22R] Secondary track or guide-ways with L shaped configuration
[20L, 20R, 22L, 22R] One or more grid of tracks or guide-ways
[24] A transition flange
[26] Vertical inner track edge
[26a] Vertical outer track edge
[27] In-wheel brake assembly
[28] In-wheel motor assembly
[29] Vertical pillars
[30] Chassis frame
[31] Active corner assembly
[32] Passive corner assembly
[33] Pillar anchorage
[w] Track frame width
[h] Track frame height
[a] Primary track outer width
[b] Primary track separation distance
[c] Secondary track separation distance
X—Side Profile—Inner track guide, disengaged from inner vertical flange normally
Y—Side Profile—Inner track guide wheels, engaged over inner vertical flange for mechanically induced contraction

DETAILED DESCRIPTION OF THE INVENTION

Embodiments of the present invention pertain to the field of automated transportation system. Particularly the invention relates to rapid transport system running on elevated tracks.

The present invention relates to the field of automated transportation system. The present invention in its embodiments discloses a transport system, comprising:

one or more grid of primary tracks or guide-ways [20L, 20R], one or more secondary tracks [22L, 22R] for exit from and entry into primary track, one or more vehicle units [100] with chassis [30] including a wheel-axle assemblies, a central controller [101] in network communication with vehicle unit [100, 100a], and one or more ingress and egress locations along the grid.

Figure 1:
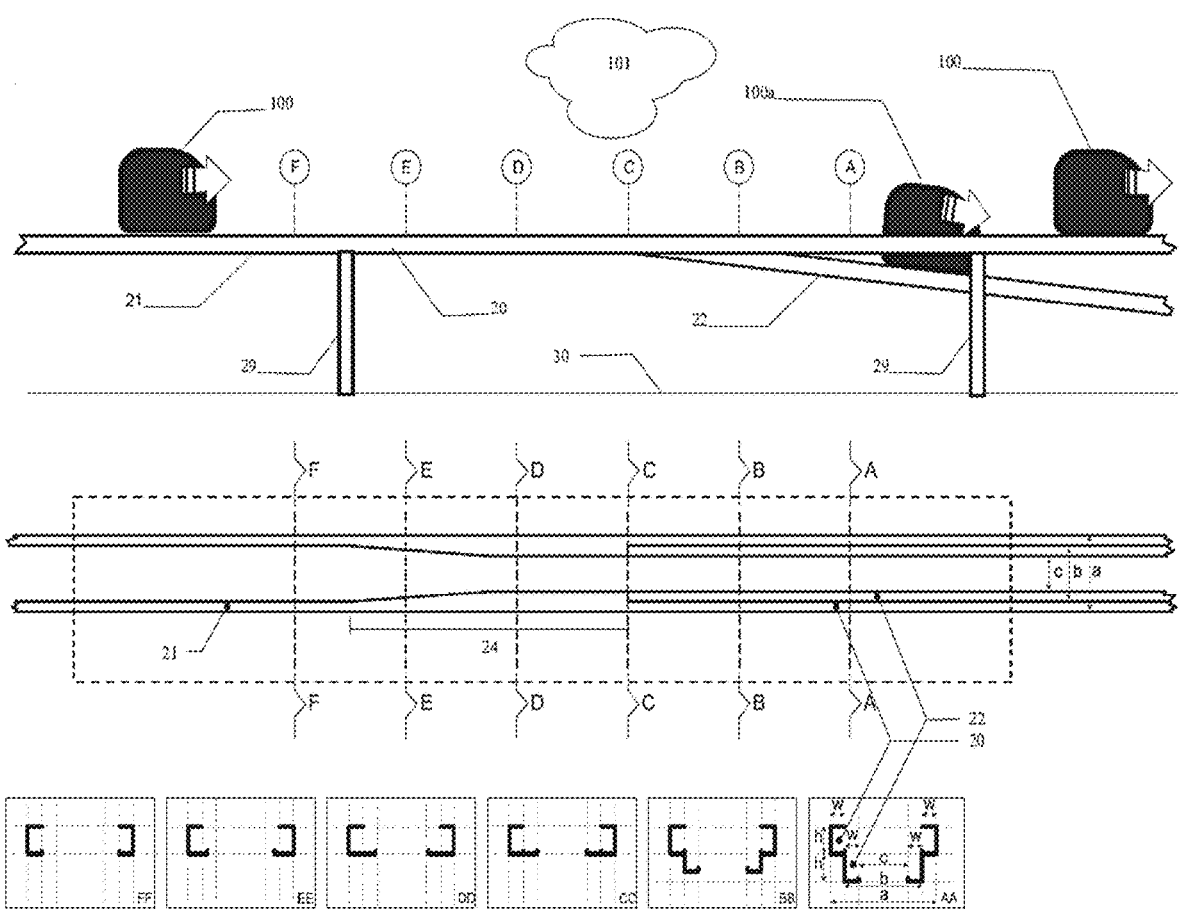
FIG. 1 depicts, a track configuration for vertical switching of personal rapid transit system represented by the following sectional view.

As illustrated in FIG. 1, the vehicles [100] are vehicles moving on the primary track [20] and vehicles [100a] depict vehicles moving on the secondary track [22]. The tracks are raised on pillars [29], firmly affixed in pillar anchorage [33]. The vehicle unit [100, 100a] comprises any vehicle unit with the chassis including the wheel-axle assembly assemblies of the present invention. The vehicle unit can be used for the transport of one or more passengers or goods.

When the vehicle unit [100] is used for transporting passengers, the unit consists of a weather protected micro environment controlled insulated shell in an aerodynamic shape fixed on the chassis. The unit can have seats for passengers. The doors for entry and exit from the vehicle can be on both sides of the unit. The unit can have a passenger recognition device for security. The unit can have a vehicle human machine interface for managing the micro-climate and allied devices required for passenger comfort and safety. The unit can have an infotainment device that can stream content preloaded or using the internet when connected to the world-wide-web. The unit can have a device for enabling an audiovisual communication link with the operations control center in response to any eventuality. The unit can have a device for enabling an emergency shutdown of the unit in response to an emergency. The unit can further have a foldable ladder like device for enabling emergency rescue of the passenger when the unit gets stranded on the track. When the vehicle unit [100] is used to transport specially abled persons, the space inside the unit can be suitably modified to serve the special needs.

When the vehicle unit [100] is used for transporting goods, the unit consists only of a weather protected platform for loading the goods. The unit can have a device for identifying the payload. Ingress and egress locations are entry and exit points along the primary track from the secondary track which conjoins a weather protected platform at a level above or below that enable an organized entry and exit of passengers from the vehicle or loading and unloading of goods from the vehicle on a platform. The platform locations are established in geographical space based upon established spatial demand. These locations can have one or vehicle more units parked alongside on one or more conjoined tracks at same or different levels for easy and seamless availability whenever called upon by the system, using any robotic delivery device. These platform locations can be specially abled person friendly. These platform locations can have an operations office, ticket vending kiosks, lifts, staircases and suitable architectural components including required building services, as per prevailing standards.

The tracks are populated with a series of wired or wireless chip devices or transponders at regular intervals as location markers or data exchangers. The vehicles are powered by sliding contact with the tracks which are electrically charged. The tracks [20, 22] further comprises of track configuration detection means detects the horizontal and vertical curvature of the tracks.

Particular embodiment comprises a central controller [101] is a controller that is in network communication with the vehicle unit [100, 100a]. Central controller [101] comprises of a network connected computer in communication with a hierarchy of network connected electronic nodes located along the tracks [20, 22] connected to the transponders, a communication system comprising of wired and wireless network as means, the central computer contains a database of all transponders and location markers along the tracks and maintains real time data of location, speed, acceleration of vehicle units, and wherein the central computer communicates with the on-board vehicle controller providing real-time instruction enabled control of vehicle unit, and herein the central computer monitors and controls the inter-spacing of all running vehicles.

Advantageously, the present invention enables a vehicle to move along the primary track and maintain the same vertical plane as the movement of the vehicle, even after changing its trajectory. Advantageously, the present invention allows for seamless, shock and jerk free change of vehicle trajectory for the comfort of the passenger. Advantageously, it provides for reduced number of mechanical parts, better integration of components exploiting multiple functional characteristics of the same components to achieve multiple objectives.

The present invention provides a three-dimensional fixed configuration of a primary rail track [20] and a secondary rail track [22] [without any moving parts] and a vehicle chassis [30] which comprises, an axle suspension frame [15,] a set of contractible axles fixed to the main wheels to assist and guide the change in trajectory by pulling inside the wheels [2W] from an extended position to a contracted position to get onto the secondary rail track [22] [change of track-widths] [FIG. 2, adaptation 1 and FIG. 14, adaptation 2] and vice-versa.

The present invention provides 2 adaptations of a vehicle borne mechanism to make the wheel axle expand and contract with the wheel, with reference to the center line of the vehicle chassis movement, without the use of any lever or arm but using a mirrored and symmetric telescopic movement along the axis of the axle itself.

The present invention provides for enabling this mirrored telescopic movement of the axle for both front and rear axle of the vehicle both synchronous and asynchronous manner without any motorized actuator as means.

Specifically, the invention in various embodiments relates to track and wheel-axle assemblage for switching of personal rapid transit system in vertical plane. The invention is described as two embodiments and in both embodiments the vehicle chassis configuration comprises a wheel-axle assembly comprising an axle suspension frame [15], a pair of axles and each axle comprising a pair of main wheels of the front and the back [2W], wherein the chassis [30] consisting of wheel axle assembly comprises a set of contractible axles fixed to the vehicle wheels [2W], and each axle enables movement of the wheels from the primary [20] to secondary track [22] for change in the trajectory or shift in vertical plane by withdrawing the wheels [2W] from expanded position [C] to contracted position [C] [FIG. 2 and FIG. 14] or from contracted [C] to expanded position [E] [FIG. 3 for Adaptation 1 and FIG. 15 for adaptation 2]. The pairs of outer guide wheels [4ow] mounted on the wheel block pairs [05, 06], normally run along the outer edge flange of the primary track [20] with the expanded track width or run along the outer edge flange of the secondary track [22] with the contracted track width, both under the influence of the linear motor actuators in adaptation 1 and compressed spring [12] in adaptation 2.

The horizontal curved path trajectory when required in course of movement is determined by the lateral electronic distance sensors for each side of the axles and controlled electronically through a wheels [2W] differential speed controller. The in-wheel motor drive [01] and in wheel brake drive [03] are positioned in alternate or swapped configuration.

In a first embodiment [Adaptation 1] discloses a system for enabling the mirrored telescopic movement of the axle for both front and rear axle of the vehicle both synchronous and asynchronous manner with the support of 6 motorized actuators [09].

The present invention, in another embodiment or Adaptation 2, provides for enabling this mirrored telescopic movement of the axle for both front and rear axle of the vehicle both synchronous and asynchronous manner with the support of only 1 motorized actuator [09].

The present invention in both adaptations, also provides for maintaining centrality of the vehicle chassis with respect to the left and right wheels wherein the left and right sliding guide block [05, 06] are so linked directly to the scissor mechanism [11] so as to maintain left right symmetricity with respect to both sides of the tracks.

Components

The present invention comprises the following key components in the vehicle along with a host of other components for additional functions:

1. An in-wheel motor drive [01] paired with an in-wheel brake drive [03] on each axle fixed to a pair of sliding wheel blocks. [05, 06].
2. A pair of sliding wheel blocks [05, 06] on each axle capable of contracting and expanding its track width on a linear slide [07] which is symmetrically fixed to the suspension frame [15] symmetrically connected to the vehicle chassis [30].
3. Two pairs of outer guide wheels [4ow] fixed on the wheel block pairs [05, 06].
4. Two pairs of inner guide wheels [4iw] mounted the wheel block pairs [05, 06] capable of moving up and down in adaptation 1 using 4 independent actuators [09].
5. Two pairs of inner guide wheels [4iw] fixed on swinging arm hinge [18] mounted the wheel block pairs [05, 06] in adaptation 2.
6. A linear actuator [09] to push and pull a link rod [10] connected to one end of the front and rear scissor mechanism [11] in each in adaptation 1.
7. A linear actuator [09] to push and pull a link rod [10] connected to the front and rear swing arms [14] of the guide wheels in adaptation 2. Further, a swinging synchronizer sliding push rod [13] aids the movement in adaptation 2. The push rod [13] It is a cylindrical rod connected perpendicularly to the push pull shaft [10], when actuated, pushes or pulls the front and rear swing arm [14] to lower or raise of the inner guide wheels [4iw] in Configuration 2 synchronously to enable the front and rear pair to roll over the inner track edge [26] passing through the transition flange [24] into the secondary track.
8. A set of compression springs [12] in adaptation 2, that hold the wheel block pairs in an expanded position at all times.
9. A scissor mechanism [11] uniquely configured and sliding symmetrically along the axle axis as well as along the scissor guide slide [08] fixed on the central plane of the chassis to symmetrically moving wheel blocks [05,06] on either side in a contraction/expansion mode along the axle axis.

The present invention comprises the following key components on the track with a host of other components for additional functions:

1. a pair of primary tracks [20] in a C shape configuration.
2. a pair of extending horizontal surface in the same plane as the primary track surface in the transition zone [02] before the trajectory switching point where the extension happens in a defined horizontal grade.
3. a pair of secondary tracks [22] in an L shape configuration located inside the primary track [20] in the desired trajectory change angle.
4. a pair of perpendicular edge flange [26] along the inner sides of the track pair for both adaptations 1 & 2 primarily required along the switching zone area only.
5. a pair of perpendicular edge flanges along [26a] the outer sides of the track pair.

Description of Configuration

In the present invention, there are two pairs of rails or tracks at the switching location. Illustrated in FIG. 1, a pair of rails or tracks which is the main pair [20] has a larger separation distance between each rail and track. The second pair of rails or tracks which is the secondary pair [22] has a smaller separation distance between each rail and track than the main pair.

Illustrated in FIGS. 1, 2, 3, 14 and 15 is the track configuration according to various embodiments of the present invention. In one embodiment the secondary pair of rails or tracks [22] are attached to the main pair of rails or tracks [20] at the point of diverge or merge, in a manner that the separation distance between them is less than the separation distance between the main pair of rails or tracks [20] by slightly more than the combined width of the main pair of rails or tracks.

In the present invention, the transition into the second pair of tracks [22] happens through a transition zone [02] over a specific length of tire rolling area along the primary track where the left and right track surfaces extend horizontally inwards—transition flange [24] to connect with the inclined secondary track wheels [2W] rolling surface, in a manner that the extended portion itself becomes the initial segment of the secondary pair of rails or tracks [22], enabling a smooth contiguous surface between primary track and secondary track for the pair of front and rear vehicle wheels [2W].

Features Common to Both Adaptation 1 & 2

In the present invention each of the wheel pairs [2W] on respective axle is capable of contracting and expanding on a horizontal plane as pairs or all together synchronously. This contraction and expansion mechanism can be mechanical, spring loaded, electro-mechanical etc. and is induced by an external trigger before such a movement is required.

In the present invention in both embodiments, the wheels run on a pair of parallel track surfaces with at least one vertical ridge on each of the pair of tracks, thus preventing the wheels from derailing from the track.

In the present invention the wheels [2W] contract inwards along the horizontal plane by the same distance equal to the width of the rail or track so that it rolls over into the transition flange [24] before changing the vehicle vertical trajectory from the main pair of rails or tracks to the secondary pair of rails or tracks and vice versa.

In the present invention there is a physical or an electronic trigger located at the beginning or a specified distance before the transition flange [24] while entering the main pair of rails or tracks [20] and while exiting the same, to instruct the contraction or expansion of the pair or pairs of wheels as required.

In the present invention there are horizontal guide wheels [4ow] running along the vertical wall [26a] of the main track [20] that prevents the chassis [30] to slip or slide sideways when within the main track [20]. In the present invention the horizontal outer guide wheels [4ow] also contract or expand synchronously with the wheels [2W] of the chassis [30]. They remain in constant touch with the vertical track surfaces and may additionally remain centered between the primary tracks [20] and secondary tracks [22] using electronic distance sensors that electronically provide differential controls to the traction wheel pairs in the front and rear of the vehicle at all times.

In a particular embodiment the present invention discloses the Adaptation 1 or A1. In reference to FIGS. 4-5, this embodiment discloses a wheel axle assembly wherein the chassis [30] of the vehicle has 2 sets of axles with 2 wheels each. Each of the front and rear axle of the vehicle have one wheel with an in-wheel drive [01] mechanism and second with an in-wheel brake [03] mechanism, both powered and controlled electrically. The wheels on the front and rear axles are configured so that the drive wheels and brake wheels are paired diagonally [FIG. 10]. The wheel axle assembly comprises set of contractible axles fixed to the vehicle wheels [2W] comprising of an axle linear slides [07, 08] and an axle suspension frame [15], a pair of sliding right slide block [05] and left slide block [06], wherein the inner guide wheels [4iw, 4iw] are mounted on guide blocs [05, 06], an in-wheel motor drive [01] paired with an in-wheel brake drive [03] on each axle. The in-wheel motor drive [28] and the in-wheel brake drive [27] mounted on a pair of pneumatic wheels [2W], one or more actuators [09], a scissor mechanism assembly [11], each side of the axles comprising an electronic lateral distance sensor, a push pull shaft with link rod [10], a common axle linear slide [07] with guide blocks [05, 06], an electronic control means.

In reference to FIGS. 6-13 showing different orientations of the wheel axle assembly in adaptation 1. In this adaptation the two pairs of inner guide wheels [4iw] engage with the inner track vertical flange during and through the switching zone extended downwards by the linear motor actuators [09]. The linear motor actuator [09] is connected to a push and pull link rod [10] connected to one end of the front and rear scissor mechanism [11], and when the vehicle reaches a potential vertical trajectory change point along the track, an electronic sensor based trigger actuates a linear motor actuator [09] to push the connected link rod [10] between the pairs of scissor mechanisms [11] connected to the front and rear axle wheel blocks [05,06] to contract [C] or expand [E] the wheels and enable the shift in trajectory in vertical plane keeping the symmetric integrity of the mechanism between the left and right sides of the primary [20] and secondary tracks [22] via a shift from primary [20] to secondary track [22] and vice-versa. The pair of slide guide blocks [05, 06] are fixed on each axle, a pair of outer guide wheels [4ow0] fixed on wheel block pairs [05, 06], a pairs of inner guide wheels [4iw] mounted on the wheel block pairs by an electrically powered actuator [09]. The force from the electrically operated actuators makes the slide blocks [05,06] to contract and expand the vehicle track width, when the guide wheels [4iw, 4ow] lowered in place simply roll over the converging and diverging inner flange [26] [FIG. 7].

In an embodiment for adaptation 1 there are horizontal guide wheels actuated and lowered into position to run along the inner vertical ridge [26] of the main track [20], transition flange [24] and the secondary track [22] ensuring that the chassis [30] remains guided at all times and does not slip or slide sideways also when within the transition section or when within the secondary track.

In embodiment for adaptation 1 the contracting and expanding force along the axle is derived directly through the force exerted by 2 independent linear actuators [09] linked directly to the scissor mechanism [11] which transfers the forces through its links, necessarily asynchronously through the graded part of transition area when the inner guide wheels [4iw] rollover the inner edge flange [26]. To maintain safe central trajectory front and rear pairs of inner guide wheels have to necessarily also synchronously actuate into position where they roll over the inner edge flange through the switch. As illustrated in FIG. 4, the front and rear axle assembly remains in contracted track-width position in the secondary track [22] guided centrally between the left and right tracks by the outer guide wheels running along the outer edge wall and the Inner guide wheels duly lowered to run between and along the inner track edge flange [26]. Within the transition zone [24], the inner guide edge flange is lower in height and the vehicle remains centrally aligned using the Inner guide wheels duly lowered [4iw-L] to run between and along the lower continual part of the inner track edge flange, while the outer guide wheels [4ow] remain disengaged from the outer edge wall.

Features Common to Both Adaptations 1 and Adaptation 2:

As illustrated in FIGS. 6 and 18, the front and rear axle assembly remains in contracted track-width position CTW in the secondary track [22] guided centrally between the left and right tracks by the outer guide wheels running along the outer edge wall and the inner guide wheels are duly lowered [4iw-L] to run between and along the inner track edge flange [26]. Within the transition zone [02], the inner guide edge flange is lower in height and the vehicle remains centrally aligned using the inner guide wheels duly lowered to run between and along the lower continual part of the inner track edge flange, while the outer guide wheels [4ow] remain disengaged from the outer edge wall [26a].

As illustrated in FIGS. 7 and 19 is the left hand side in-wheel clutch brake in front passive corner assembly [32]. The front and rear axle assembly remains in expanded track-width position in the primary track [22] guided centrally between the left and right tracks by the outer guide wheels and the inner guide wheels running between and along the upper part of the inner track edge [26] flange. Three or more sets of electronic distance sensors on both outer sides of the chassis are used to electronically maintain the centrality of the chassis between the left and right primary and secondary tracks at all times.

As illustrated in FIGS. 10 and 22, vehicle chassis [30] consisting of 4 wheels which are fixed and do not rotate relative to the axle axis. One set of diagonally placed pair of wheels comprising of a hub mounted motor device is used for propulsion [active corners] while the other set of diagonally placed pair of wheels with an electro mechanical braking device runs freely [passive corners].

In-wheel brake assembly [27] according to embodiment of the present invention is a wheel assembly consisting of a wheel rim and a wheel [2W] [pneumatic/other] mounted on the axle corner where an electro-mechanical brake drive is housed within the wheel rim. Normally this wheel [2W] in the present embodiment simply follows the active wheel unless the brake is activated, therefore passive. When this assembly is considered as mounted on a slide block together with a set of outer guide wheels [4ow] and inner guide wheels [4iw] mounted on a fixed, actuated or swing arm [14] it comprises a passive corner assembly [31]. Two of these passive corner assemblies are diagonally mounted with reference to the chassis.

In-wheel motor assembly [28] is a wheel assembly consisting of a wheel rim and a tyre [pneumatic/other] mounted on the axle corner where an electrical motor drive [with or without a gear] is housed within the wheel rim. Normally this wheel [2W] drives the vehicle, therefore active. When this assembly is considered as mounted on a slide block together with a set of outer guide wheels [4ow] and inner guide wheels [4iw] mounted on a fixed, actuated or swing arm [14] it comprises an active corner assembly [31]. Two of these active corner assemblies are diagonally mounted with reference to the chassis opposite to the passive corner assembly [31].

A set of 4 or more shock absorbing devices [19] connect the chassis [30] with the front and rear axles to reduce the vertical jerks that may be generated while the vehicle is in motion. FIGS. 8 and 20, illustrates horizontal electronic side distance sensors [17] which are a set of 4 or more distance measurement sensors are placed horizontally perpendicular to the chassis' longitudinal axis to provide differential measure between left and right spacing between the chassis' front, middle and back with reference to the outer left and right wall of the primary or secondary track to aid in ascertaining the horizontal curvature of the instant track section for the purpose of electronically controlling the front and rear motor drives and the required horizontal trajectory.

FIGS. 12 and 24, illustrates the scissor assembly [11] consisting of 4 sets of members with 4 pivot points. Set of 2 pivots are fixed on opposite sides of the axle slide blocks [05,06] while other set of 2 pivots are fixed on a mirrored pair of sliding blocks on a perpendicularly aligned slide guide [08]. When pushed or pulled the members behave like the arms of an inverted scissor.

Specific Embodiment of the Present Invention Disclosing Adaptation 2. [FIGS. 14-25]

In another embodiment [Adaptation 2] the system comprises a transport system, comprising one or more grid of tracks or guide-ways [20L, 20R, 22L, 22R], one or more vehicle units [100] with chassis including a wheel-axle assembly, a central controller [101] in network communication with vehicle unit [100], and one or more ingress and egress locations, wherein the vehicle chassis configuration with a wheel-axle assembly comprises a pair of axles consisting a pair of main wheels [2W, 2W], one or more guide wheels [4$iw$, 4$ow$], set of contractible axles fixed to the vehicle wheels [2W], comprising of an axle linear slide [07] and an axle suspension frame [15], a pair of guide blocks, right slide [05] and left slide [06] guide block, wherein the inner guide wheels [4$iw$] are mounted on guide blocs [05, 06], a pair of wheel blocks comprising right slide guide block [05] and left slide guide block [06], contractor guide linear slide [08], compressed spring [12] and a swinging arm hinge [18], wherein the inner guide wheels [4$iw$] are mounted on swinging arms hinge [18] by swing arms [14] which is itself mounted the wheel block pairs [5,6], an in-wheel motor drive [01] paired with an in-wheel brake drive [03] on each axle; a linear motor actuator [09] connected to push and pull link rod [10] further connected to the front and rear swing arms [14] of the guide wheels through a slide bar connected to either sides of the link rod [10], a set of compression springs [12] that hold the wheel block pairs [05, 06] in an expanded position [E] at all times. The wheel axle assembly further comprises a scissor mechanism assembly [11], an electronic distance sensor, a push-pull shaft with link rod [10], a contractor guide linear slide with guide blocks [8], an electronic control means, wherein the inner guide wheels [4$iw$-L, 4$iw$-R] are hinged to the guide blocks [05,06], wherein the contraction and expansion of track-width is enabled by the inner guide wheels where the forces required to do so along the axle is derived from inner guide wheels rolling [4$iw$] over the converging/diverging edge flange when actuated into the required position using a single linear motor actuator [09] and related electronic controls. The asynchronous contraction and expansion of the front and rear axles is made possible using the link rod end slide bar enabling the front and rear swing inner guide wheel arms to contract and expand differentially on its own and the expanding forces from the compressed springs [12] between the wheel block pairs [05, 06] keeping the vehicle continuously aligned along the central plane between the track pairs at all times. A swing synchronizer sliding push rod [13] which is a cylindrical rod connected perpendicularly to the push pull shaft [10], when actuated, pushes or pulls the front and rear swing arm to lower or raise of the inner guide wheels in adaptation 2 synchronously to enable the front and rear pair to roll over the inner track edge passing through the transition flange into the secondary track.

In embodiment for adaptation 2 there are horizontal guide wheels actuated to swing into lower position to run along the inner vertical ridge [26] of the main track [20], transition flange [24] and the secondary track [22] ensuring that the chassis [30] remains guided at all times and does not slip or slide sideways also when within the transition section or when within the secondary track. Between adaptation 1 & 2, adaptation 2 offers a superior and safer solution by way of front and rear track width contraction and expansion feature with significant reduction in number of moving parts and electronic controls required to synchronously achieve the objective using at least 4 independent linear actuators for raising and lowering inner guide wheels [4$iw$R and 4$iw$L] into position and 2 more for actuating the scissor mechanism to expand and contract [09 E and 09 C]. Another advantage offered by the modified configuration is by way of allowing asynchronous contraction and expansion of the front and rear axles with a single linear actuator [09] and related electronic controls. Another advantage in this embodiment is the safe central trajectory being automatically offered integrally by mechanical design without any compulsion to maintain electronic [twin actuators [09 & 09] induced] synchronicity between front and rear axles.

Guideways

The guide-ways or tracks for switching vehicle in a vertical plane comprise:
a primary rail track with [C shaped configuration [20], a secondary rail track with L-shaped configuration [22R, 22L], one or more vertical ridge, one or more perpendicular edge flange along the inner sides and outer side of the track pair, a trigger point [21], a transition flange [24], and a switch point comprising trigger point [21], wherein at the switch point there are two pairs of rails or tracks comprising primary and secondary rails, wherein the secondary rail track has a smaller separation distance than the primary rail track, is fixed in horizontal gradient within the primary rail track at a switch point, and the secondary pair of rails or tracks are attached to the main pair of rails or tracks at the point of diverge or merge, the primary rail track and secondary rail track is fixed on rail support means, the perpendicular edge flange extends along the inner and outer sides of rail track. The transition flange [24] extends horizontally from the bottom of the primary rail track [20R, 20L] and comprises the initial segment of the secondary rail track, wherein a trigger point [21] is located along the primary track [20] at a predefined distance in advance to the transition flange [24] and wherein the rail track surfaces are provided with at least one vertical ridge to prevent wheels from derailing.

Description of Switching Method in Present Invention

The vehicle [100] runs along the primary track [20] on the horizontal surface with the wheel blocks [05, 06] in an expanded position.

The pairs of the outer guide wheels [4$ow$] mounted on the wheel block pairs, normally run along the outer edge flange [26$a$] of the primary track [20] with the expanded track width and the secondary track [22] with the contracted track width under the influence of the forces of the linear motor [09 & 09] in adaptation 1 and the expanding forces from the compressed springs [12] between the wheel block pairs keeping the vehicle continuously aligned along the central plane between the track pairs at all times in adaptation 2.

In one embodiment for adaptation 1 the method for trajectory shifts of a vehicle unit in a transport system, wherein the joining of the vehicle to the secondary track [22] from a primary track [20] comprises steps:
actuation of electronic sensor based trigger and front and rear linear motors [09 and 09] to pull the connected scissor mechanism [11] at the potential vertical trajectory change point thereby pulling the wheel blocks [05, 06] to contract the vehicle track width and simultaneously lowering the two front and two rear inner guide wheels [4iw L] in pairs asynchronously, where they start running on the inner edge flange of the track pair in the following order:
1. Inner edge flange of the primary track
2. inner horizontally graded edge flange of the transition track zone
3. inner edge flange of the straight portion of the transition track zone
4. inner edge flange of the vertically graded secondary track aligned in the same vertical plane The contracting and expanding force along each of the axles is derived directly through the force exerted by the linear motor actuator [09 and 09] linked directly to the front and rear scissor mechanism [11] which transfers the forces symmetrically through its links, while the inner track guide wheels [4iw] simply rolls over the inner flange of the track [26] for guidance. The contracting scissor mechanism forces the pair of rolling wheel blocks to contract and reduce its track width, the outward force of the scissor mechanism [11] keeping all the outer guide wheels and therefore the chassis [30] aligned centrally between the tracks pairs [20, 22] at all times throughout the transition zone and after switching the tracks.

In another embodiment the method for trajectory shift of a vehicle unit in a transport system for implementation of adaptation 2, joining the secondary track [22] from a primary track [20] comprising of steps: [Ref FIG. 14, 15]

actuation of electronic sensor-based trigger and linear motor to push the connected link rod [10] and the swing synchronizer sliding push rod [13] at the potential vertical trajectory change point between the pairs of guide wheels on the front and rear axle wheel blocks to swing the guide wheels [4iw] into a position where they start running on the inner edge flange of the track pair in the following order.
1. inner edge flange of the primary track
2. inner horizontally graded edge flange of the transition track zone followed by
3. inner edge flange of the straight portion of the transition track zone
4. inner edge flange of the vertically graded secondary track aligned in the same vertical plane The contracting and expanding force along each of the axles is derived directly through the force exerted by the inner track guide wheels [4iw] rolling over the inner flange of the track [26], linked directly to the scissor mechanism [11] which transfers the forces symmetrically through its links, automatically asynchronously through the graded part of transition area when the front inner guide wheels [4iw] rollover the inner edge flange followed by the rear inner guide wheels [4iw].

The converging grade of the inner edge flange [26] forces the pair of rolling wheel blocks to contract and reduce its track width, compressing the springs [12] between the wheel blocks [05, 06]. The outward force of the compressed springs [12] keeps all the guide wheels and therefore the chassis [30] aligned centrally between the track's pairs at all times throughout the transition zone and after switching the tracks.

Reversibly when joining the primary track [20] from a secondary track [22] [FIG. 15 and FIG. 17], the diverging grade of the inner edge flange eases the compressed springs [12] between the wheel blocks when the guide wheels roll [4iw] along the diverging inner edge flange [26].

These outer guide wheels [4ow] remain engaged with the outer edge flange [26a] at all times, under the expansive forces of the compression springs, except during the process of contraction/expansion through the transition zone [02] to be able to roll into the inner track pair where again they engage with the outer edge flange of the inner track pair.

Although the present invention has been described with reference to a certain preferred embodiment, work is underway towards the refinement of the invention. Therefore, variations and modifications are possible based on the disclosure above without departing from the spirit and scope of the invention.

I claim:
1. A transport system, comprising:
one or more tracks (20L, 20R, 22L, 22R); in order to keep terminology consistent and eliminate indefiniteness issues
one or more vehicle units (100) with chassis including a wheel-axle assembly;
a central controller (101) in network communication with a vehicle unit;
one or more ingress and egress locations along the primary track (20);
 wherein the vehicle chassis configuration with a wheel-axle assembly comprises a pair of axles consisting a pair of vehicle wheels (2W), one or more guide wheels (4iw, 4ow), comprising inner guide wheels (4iw) and outer guide wheels (4ow),
set of contractible axles fixed to the vehicle wheels (2W), comprising of a common axle linear slide (07) fixed on an axle suspension frame (15) fixed to the chassis (30), and wheel block pairs (05, 06) comprising a pair of right slide blocks (05) and left slide blocks (06);
 wherein the inner guide wheels (4iw) are mounted on the wheel block pairs (05, 06) a contractor guide linear slide (08), a compression spring (12) and a swing synchronizer sliding push rod (13),
 wherein the inner guide wheels (4iw) are mounted on swinging arms (14), an in-wheel motor drive (01) paired with an in-wheel brake drive (03) on each axle;
a linear motor actuator (09) connected to a push and pull link rod (10) connected to the front and rear swing arms of the left and right guide wheels through the swing synchronizer sliding push rod (13);
a set of compression springs (12) that hold the wheel block pairs (05, 06) in an expanded position at all times;
a scissor mechanism assembly (11);
a scissor guide linear slide (08);
a set of horizontal electronic distance sensors (17); and
an electronic control means,
 wherein the contraction and expansion of track-width is enabled by the inner guide wheels (4iw), where the forces required to do so along the axle is derived from inner guide wheels (4iw) rolling over the converging or diverging edge flange (26) when actuated into the required position using the linear motor actuator (09) and related electronic controls, and
 wherein asynchronous contraction and expansion of the front and rear axles is made possible using the swing synchronizer sliding push rod (13) enabling the front and rear swing inner guide wheel arms to contract and expand differentially automatically, wherein the expanding forces from the compression springs (12) between the wheel block pairs (05, 06) keeping the vehicle continuously aligned along a central plane of the primary track (20) at all times, and wherein a safe central trajectory is automatically offered integrally by design without need to maintain synchronicity between front and rear axles.

2. The transport system as claimed in claim 1, wherein the tracks for switching the vehicle unit in a vertical plane comprises:

a primary rail track (20) with C-shaped configuration (20R, 20L);

a secondary rail track (22) with L-shaped configuration (22R, 22L); and one or more vertical ridges, one or more perpendicular edge flanges along the inner sides and outer sides of the track pair, a transition flange (24), and a switch point comprising a trigger point (21), wherein at the switch point there are two pairs of rails or tracks comprising primary and secondary rails, wherein the secondary rail track (22) has a smaller separation distance than the primary rail track (20), and is fixed in horizontal gradient within the primary rail track at a switch point, wherein the secondary rail tracks are attached to the main rail tracks at a point of diverge or merge, the primary rail track and secondary rail track are fixed on rail support means (29), the perpendicular edge flange extends along the inner (26) and outer sides of rail track (26a), wherein the transition flange (24) extends horizontally from the left and right bottom of the primary track (20) and comprises the initial segment of the secondary track (22), and wherein a trigger point (21) is located along the primary track (20) at a predefined distance in advance to the transition flange (24), and wherein the rail track surfaces are provided with at least one vertical edge flange (26, 26a) to prevent wheels from derailing.

3. The transport system as claimed in claim 2, wherein the converging and diverging edge flange (26) forces the inner track guide wheels (4iw) to contract and expand the vehicle track-width, when swung in place by using the linear motor actuator (09) while all asynchronous front and rear axle movements are achieved by the track configuration itself.

4. The transport system as claimed in claim 2, wherein a horizontal curved path trajectory, when required, is determined by lateral electronic distance sensors (17) for each sides of the axles and electronically controlled through a differential speed controller of the left and right vehicle wheels (2W).

5. The transport system as claimed in claim 1, wherein the secondary tracks (22) are provided at one or more switching node locations where it the secondary tracks (22) merges or diverge from the primary tracks (20).

6. The transport system as claimed in claim 1, wherein the tracks are populated with a series of wired or wireless chip devices or transponders at regular intervals as location markers or data exchangers.

7. The transport system as claimed in and claim 1, wherein the vehicle units are powered by sliding contact with the tracks, which are electrically charged.

8. The transport system as claimed in claim 1, wherein a track configuration detection means detects the horizontal and vertical curvature of the tracks.

9. The transport system as claimed in claim 1, wherein the transport system is a rapid transport system running on elevated tracks.

10. The transport system as claimed in claim 1, wherein the vehicle chassis configuration with a wheel-axle assembly comprises a pair of axles and each axle comprising a pair of vehicle wheels (2W), a set of contractible axles fixed to the vehicle wheels (2W), and each axle enables movement of the wheels from the primary track (20) to the secondary track (22) for a change in trajectory or shift in vertical plane by withdrawing the wheels (2W) from an extended position (E) to a contracted position (C) or from the contracted position (C) to the extended position (E).

11. The transport system as claimed in claim 1, wherein the in-wheel motor drive (01) and the in-wheel brake drive (03) are enabled in an alternate or swapped configuration.

12. The transport system as claimed in claim 1, wherein the wheel block pairs (05, 06) are fixed on each axle, a pair of outer guide wheels (4ow) are fixed on wheel block pair (05, 06), a pairs of inner guide wheels (4iw) are mounted on the swing arm pairs (14) on a pair of hinges (18), and the wheel block pairs (05, 06) are connected to the scissor mechanism assembly (11) for maintaining symmetry.

13. The transport system as claimed in 1, wherein the scissor mechanism assembly (11) is configured symmetrically along an axle axis as well as a central plane of the chassis (30) to symmetrically move the wheel block pairs (05, 06) on either side in a contraction or expansion mode along the axle axis.

14. The transport system as claimed in claim 1, wherein the central controller (101) comprises;

a network connected computer in communication with a hierarchy of network connected electronic nodes located along the tracks connected to transponders; and a communication system comprising wired and wireless network means, wherein the central computer contains a database of all transponders and location markers along the tracks and maintains real time data of location, speed, acceleration of vehicle units, wherein the central computer communicates with an on-board vehicle controller providing real-time instruction enabled control of the vehicle unit, and wherein the central computer monitors and controls inter-spacing of all running vehicle units (100).

15. The transport system as claimed in claim 1, wherein pairs of outer guide wheels (40w-L, 4ow-R) mounted on the wheel block pairs (05, 06), run along the outer edge flange (26a).

16. The transport system as claimed in claim 1, wherein the pairs of outer guide wheels (4ow) mounted on the wheel block pairs (05, 06), run along the outer edge flange (26a) under the influence of the expanded track width and are actuated and maintained by the compression spring (12).

17. A method for trajectory shift of a vehicle unit in a transport system as claimed in claim 1, joining a secondary track (22) to a primary track (20) comprising:

actuating an electronic sensor based trigger and a linear motor;

wherein, the actuation pushes a connected link rod at a potential vertical trajectory change point between the pairs of inner guide wheels (4iw) on the front and rear wheel block pairs (5, 6) to swing the inner guide wheels (4iw) into a position where the inner guide wheels (4iw) start running on an inner edge flange (26) of the track in the following order:

inner edge flange (26) of the primary track (20);

inner horizontally graded edge flange of a transition track zone (02) followed by the inner edge flange (26) of a straight portion of the transition track zone (02);

inner edge flange (26) of the vertically graded secondary track (22) aligned in the same vertical plane;

the converging grade of the inner edge flange (26) forces the wheel block pairs (5, 6) to contract and reduce width;

compressing the compression springs (12) between the wheel blocks (5, 6); and the outward force of the compression springs (12) keeps all the guide wheels, and therefore the chassis (30) is aligned centrally between the tracks (20, 22) at all times throughout the transition track zone (02) and after switching the tracks.

18. The method for trajectory shift of a vehicle unit in a transport system as claimed in claim 17, wherein the outer guide wheels (4ow) remain engaged with an outer edge flange (26a) of the primary track pair (20) at all times, under the expanded position, except during the process of contraction or expansion through the transition track zone (02) to be able to roll into the inner secondary track pair (22) where again they engage with the outer edge flange (26a) of the inner secondary track pair (22).

19. The method for trajectory shift of a vehicle unit in a transport system as claimed in claim 17, wherein the outer guide wheels (4ow) remain engaged with the outer edge flange (26a) of the primary track (20) at all times, under the expansive forces of the compression springs (12), except during the process of contraction or expansion through the transition track zone (02), to roll into the inner secondary track pair (22), where again they engage with the outer edge flange (26a) of the inner secondary track pair (22).

20. The method for trajectory shift of a vehicle unit in a transport system as claimed in claim 17, wherein the contracting and expanding force along each of the axles is derived directly through the force exerted by the inner guide wheels (4iw) rolling over the converging or diverging inner edge flange (26) along the transition track zone (02), linked directly to a scissor mechanism (11) which transfers the forces through links, automatically and asynchronously through the graded part of a transition area (24) when the inner guide wheels of each axle roll over the inner edge flange (26).

21. The method for trajectory shift of a vehicle in a transport system as claimed in claim 17, wherein the continuity of the surface is maintained under the vehicle wheels (2W), given a seamless contiguous base surface of the primary track (20), the secondary track (22) and the transition track portion (24).

* * * * *